US012807404B2

(12) United States Patent
Wente et al.

(10) Patent No.: US 12,807,404 B2
(45) Date of Patent: Nov. 24, 2026

(54) REFUSE VEHICLE WITH EXTENSION AND LIFT APPARATUS

(71) Applicant: Oshkosh Corporation, Oshkosh, WI (US)

(72) Inventors: Derek Wente, Austin, MN (US); Martin Schimke, Oshkosh, WI (US); Bennett Unfried, Oshkosh, WI (US); Caleb Binder, Oshkosh, WI (US); Vince Schad, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 392 days.

(21) Appl. No.: 18/399,544

(22) Filed: Dec. 28, 2023

(65) Prior Publication Data

US 2024/0217734 A1 Jul. 4, 2024

Related U.S. Application Data

(60) Provisional application No. 63/435,928, filed on Dec. 29, 2022.

(51) Int. Cl.
*B65F 3/04* (2006.01)
*B65F 3/02* (2006.01)

(52) U.S. Cl.
CPC ...... *B65F 3/041* (2013.01); *B65F 2003/0269* (2013.01); *B65F 2003/0279* (2013.01)

(58) Field of Classification Search
CPC ........ B65F 2003/023; B65F 2003/0276; B65F 2003/0266; B65F 2003/0269; B65F 3/041; B65F 3/046; B65F 2003/025; B65F 3/04; B65F 1/1452; B66F 9/08; B66F 11/046; B66F 9/0655; B65G 65/23; B65G 67/46; E04H 12/182; B25J 18/025; B66C 23/701; B66C 23/703; B66C 23/706
USPC ................ 414/648, 420, 540, 422, 408, 409
See application file for complete search history.

(56) References Cited

U.S. PATENT DOCUMENTS

| | | | | |
|---|---|---|---|---|
| 2,592,324 A * | 4/1952 | Oliver | B65F 3/08 | 414/409 |
| 4,219,298 A * | 8/1980 | Stragier | B65F 3/08 | 414/544 |
| 4,669,940 A * | 6/1987 | Englehardt | B65F 3/08 | 414/303 |
| 4,964,780 A * | 10/1990 | Karvonen | B66F 9/0655 | 414/718 |
| 5,049,026 A * | 9/1991 | Bingman | B65F 3/08 | 414/733 |
| 6,491,489 B1 * | 12/2002 | Stragier | B65F 3/08 | 414/409 |
| 9,403,641 B1 * | 8/2016 | Ghibaudo | B65F 3/02 | |
| 10,308,429 B2 * | 6/2019 | McNeilus | B65F 3/08 | |
| 10,730,694 B2 * | 8/2020 | Goedken | B65F 3/08 | |

(Continued)

*Primary Examiner* — Gregory W Adams
(74) *Attorney, Agent, or Firm* — Foley & Lardner LLP

(57) ABSTRACT

One embodiment relates to a refuse vehicle. The refuse vehicle includes a frame, a grabber assembly configured to selectively engage a refuse container, a lift assembly coupled to the grabber assembly, and an extension assembly coupled to the frame and the lift assembly. The lift assembly includes a first electric motor configured to drive the lift assembly to raise the grabber assembly. The extension assembly includes a second electric motor configured to drive the extension assembly to move the lift assembly relative to the frame.

20 Claims, 20 Drawing Sheets

(56) References Cited

U.S. PATENT DOCUMENTS

| | | | |
|---|---|---|---|
| 2020/0346854 | A1 | 11/2020 | Rocholl et al. |
| 2020/0346855 | A1 | 11/2020 | Rocholl et al. |
| 2020/0346856 | A1 | 11/2020 | Rocholl et al. |
| 2020/0346857 | A1 | 11/2020 | Rocholl et al. |
| 2020/0346858 | A1 | 11/2020 | Buege et al. |
| 2020/0346859 | A1 | 11/2020 | Buege et al. |
| 2020/0346860 | A1 | 11/2020 | Buege et al. |
| 2020/0346861 | A1 | 11/2020 | Rocholl et al. |
| 2020/0346862 | A1 | 11/2020 | Rocholl et al. |
| 2020/0347659 | A1 | 11/2020 | Rocholl et al. |
| 2020/0399057 | A1 | 12/2020 | Rocholl et al. |
| 2021/0122568 | A1* | 4/2021 | Boivin ...................... B65F 3/08 |
| 2021/0229908 | A1 | 7/2021 | Rocholl et al. |
| 2021/0323763 | A1 | 10/2021 | Koga et al. |
| 2021/0323765 | A1 | 10/2021 | Koga et al. |
| 2022/0033181 | A1 | 2/2022 | Koga et al. |
| 2022/0097961 | A1 | 3/2022 | Koga et al. |
| 2022/0097964 | A1 | 3/2022 | Koga et al. |
| 2022/0106114 | A1 | 4/2022 | Buege et al. |
| 2022/0106115 | A1 | 4/2022 | Buege et al. |
| 2022/0169444 | A1 | 6/2022 | Rocholl et al. |
| 2022/0219896 | A1 | 7/2022 | Gary et al. |
| 2022/0267090 | A1 | 8/2022 | Rocholl et al. |
| 2022/0307312 | A1 | 9/2022 | Rocholl et al. |
| 2022/0340359 | A1 | 10/2022 | Rocholl et al. |
| 2022/0380123 | A1 | 12/2022 | Buege et al. |
| 2023/0002152 | A1 | 1/2023 | Koga et al. |
| 2023/0039974 | A1 | 2/2023 | Rocholl et al. |
| 2023/0242337 | A1 | 8/2023 | Rocholl et al. |
| 2023/0278786 | A1 | 9/2023 | Rocholl et al. |
| 2023/0286741 | A1 | 9/2023 | Buege et al. |
| 2023/0294915 | A1 | 9/2023 | Koga et al. |
| 2023/0303321 | A1 | 9/2023 | Koga et al. |
| 2023/0356934 | A1 | 11/2023 | Wente et al. |
| 2023/0356937 | A1 | 11/2023 | Wente et al. |
| 2023/0356938 | A1 | 11/2023 | Kappers et al. |
| 2023/0356939 | A1 | 11/2023 | Wente et al. |
| 2023/0356942 | A1 | 11/2023 | Koga et al. |
| 2023/0382640 | A1 | 11/2023 | Buege et al. |
| 2023/0407695 | A1 | 12/2023 | Rocholl et al. |
| 2024/0116706 | A1 | 4/2024 | Rocholl et al. |
| 2024/0131728 | A1 | 4/2024 | Buege et al. |
| 2024/0166434 | A1 | 5/2024 | Rocholl et al. |
| 2024/0217734 | A1 | 7/2024 | Wente et al. |
| 2024/0217735 | A1 | 7/2024 | Rocholl et al. |
| 2024/0217736 | A1 | 7/2024 | Schad et al. |
| 2024/0217737 | A1 | 7/2024 | Schad et al. |
| 2024/0286831 | A1 | 8/2024 | Koga et al. |
| 2024/0300734 | A1 | 9/2024 | Koga et al. |
| 2024/0317489 | A1 | 9/2024 | Rocholl et al. |
| 2024/0343481 | A1 | 10/2024 | Rocholl et al. |

* cited by examiner

REFUSE VEHICLE WITH EXTENSION AND LIFT APPARATUS

CROSS-REFERENCE TO RELATED PATENT APPLICATION

This application claims the benefit of and priority to U.S. Provisional Application No. 63/435,928, filed on Dec. 29, 2022, the entire disclosure of which is hereby incorporated by reference herein.

BACKGROUND

The present disclosure relates to refuse vehicles. More specifically, the present disclosure relates to loading apparatuses for a refuse vehicle.

SUMMARY

One embodiment relates to a refuse vehicle. The refuse vehicle includes a frame, a grabber assembly configured to selectively engage a refuse container, a lift assembly coupled to the grabber assembly, and an extension assembly coupled to the frame and the lift assembly. The lift assembly includes a first electric motor configured to drive the lift assembly to raise the grabber assembly. The extension assembly includes a second electric motor configured to drive the extension assembly to move the lift assembly relative to the frame.

Another embodiment relates to an extension assembly for a refuse vehicle. The extension assembly includes a first member configured to be coupled to a frame of the refuse vehicle, a second member configured to translate relative to the first member, a third member configured to be coupled to a grabber assembly and configured to translate relative to the second member, a pinion coupled to the first member, an electric motor coupled to the pinion, a rack coupled to the second member and engaging the pinion, a first guide and a second guide coupled to the second member, and a tensile member extending between and engaging the first guide and the second guide. The first member is fixedly coupled with the tensile member at a first point and the third member is fixedly coupled with the tensile member at a second point. The electric motor is configured to drive the pinion to cause the second member to translate relative to the first member. The tensile member causes the third member to translate relative to the second member in response to translation of the second member relative to the first member.

Still another embodiment relates to a lift assembly for a refuse vehicle. The lift assembly includes a track having a straight portion and a curved portion extending above the straight portion, a drive member rotatably coupled to the straight portion of the track, an electric motor configured to drive rotation of the drive member, a guide rotatably coupled to the curved portion of the track, a tensile member engaging the drive member the guide, a carriage fixedly coupled to the tensile member, a linkage coupling the carriage to the track, and a grabber assembly coupled to the carriage and configured to selectively engage a refuse container. The linkage includes a first member received within the track and a second member coupling the first member to the track. The second member is configured to rotate relative to the carriage as the first member travels along the curved portion of the track.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a lift assembly, an extension or reach assembly, and a grabber assembly. The reach assembly includes multiple sections that are telescopingly coupled with each other and configured to extend or retract. The lift assembly is coupled at an end of the reach assembly. The grabber assembly is coupled with and configured to ascend or descend the lift assembly. A motor that drives the grabber assembly to ascend or descend the lift assembly is positioned on the flit assembly and not on the grabber assembly to thereby reduce a mass of the grabber assembly. Further, the grabber assembly includes a single motor with a worm drive such that the grabber assembly is reduce din mass. The extension assembly is also configured, through a rack, and a chain and sprocket drive, to transfer linear relative translation between the sections from a single motor.

Refuse Vehicle

Figure 1:
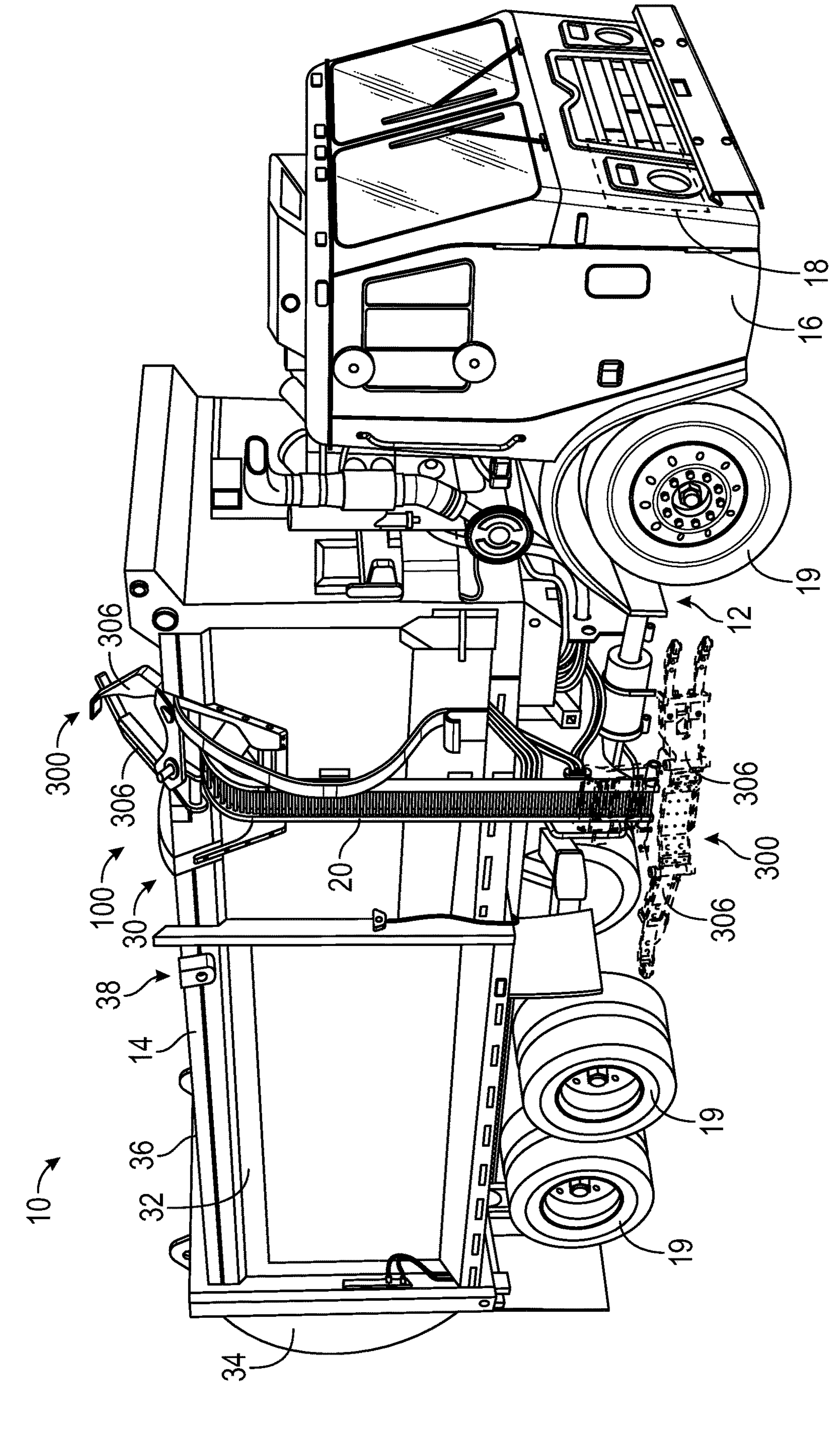
FIG. 1 is a perspective view of a refuse vehicle including a side loading apparatus, according to some embodiments.

According to the exemplary embodiment shown in FIG. 1, a vehicle, shown as refuse vehicle 10 (e.g., a garbage truck, a waste collection truck, a sanitation truck, etc.), is configured as a side-loading refuse truck having a first lift mechanism/system (e.g., a side-loading lift assembly, etc.), shown as lift assembly 100. In other embodiments, the refuse vehicle 10 is configured as a front-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a plurality of tractive elements, shown as wheels 19, and/or to other systems of the refuse vehicle 10 (e.g., a pneumatic system, a hydraulic system, etc.). The engine 18 may be configured to utilize one or more of a variety of fuels (e.g., gasoline, diesel, biodiesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. According to an exemplary embodiment, a door, shown as top door 38, is movably coupled along the cover 36 to seal the opening thereby preventing refuse from escaping the refuse compartment 30 (e.g., due to wind, bumps in the road, etc.). Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes a first lift mechanism/system (e.g., a front-loading lift assembly, etc.), shown as lift assembly 100. The lift assembly 100 includes a grabber assembly, shown as grabber assembly 300, movably coupled to a track, shown as track 20, and configured to move along an entire length of track 20. According to the exemplary embodiment shown in FIG. 1, the track 20 extends along substantially an entire height of the body 14 and is configured to cause the grabber assembly 300 to tilt near an upper height of the body 14. In other embodiments, the track 20 extends along substantially an entire height of body 14 on a rear side of the body 14.

Referring still to FIG. 1, the grabber assembly 300 includes a pair of grabber arms shown as grabber arms 306. The grabber arms 306 are configured to rotate about an axis extending through a bushing. The grabber arms 306 are configured to releasably secure a refuse container to the grabber assembly 300, according to an exemplary embodiment. The grabber arms 306 rotate about the axis extending through the bushing to transition between an engaged state and a disengaged state. In the engaged state, the grabber arms 306 are rotated towards each other such that the refuse container is grasped therein. In the disengaged state, the grabber arms 306 rotate outwards (as shown in FIG. 1) such that the refuse container is not grasped therein. By transitioning between the engaged state and the disengaged state, the grabber assembly 300 releasably connects the refuse container to the grabber assembly 300. The refuse vehicle 10 may pull up along-side the refuse container, such that the refuse container is positioned to be grasped by the grabber assembly 300 therein. The grabber assembly 300 may then transition into an engaged state to grasp the refuse container. After the refuse container has been securely grasped, the grabber assembly 300 may be transported along the track 20 with the refuse container. When the grabber assembly 300 reaches the end of the track 20, the grabber assembly 300 may tilt and empty the contents of the refuse container in the refuse compartment 30. The tilting is facilitated by the path of the track 20. When the contents of the refuse container have been emptied into the refuse compartment 30, the grabber assembly 300 may descend along the track 20 and return the refuse container to the ground. Once the refuse container has been placed on the ground, the grabber assembly 300 may transition into the disengaged state, releasing the refuse container.

Lift Assembly

Figure 2:
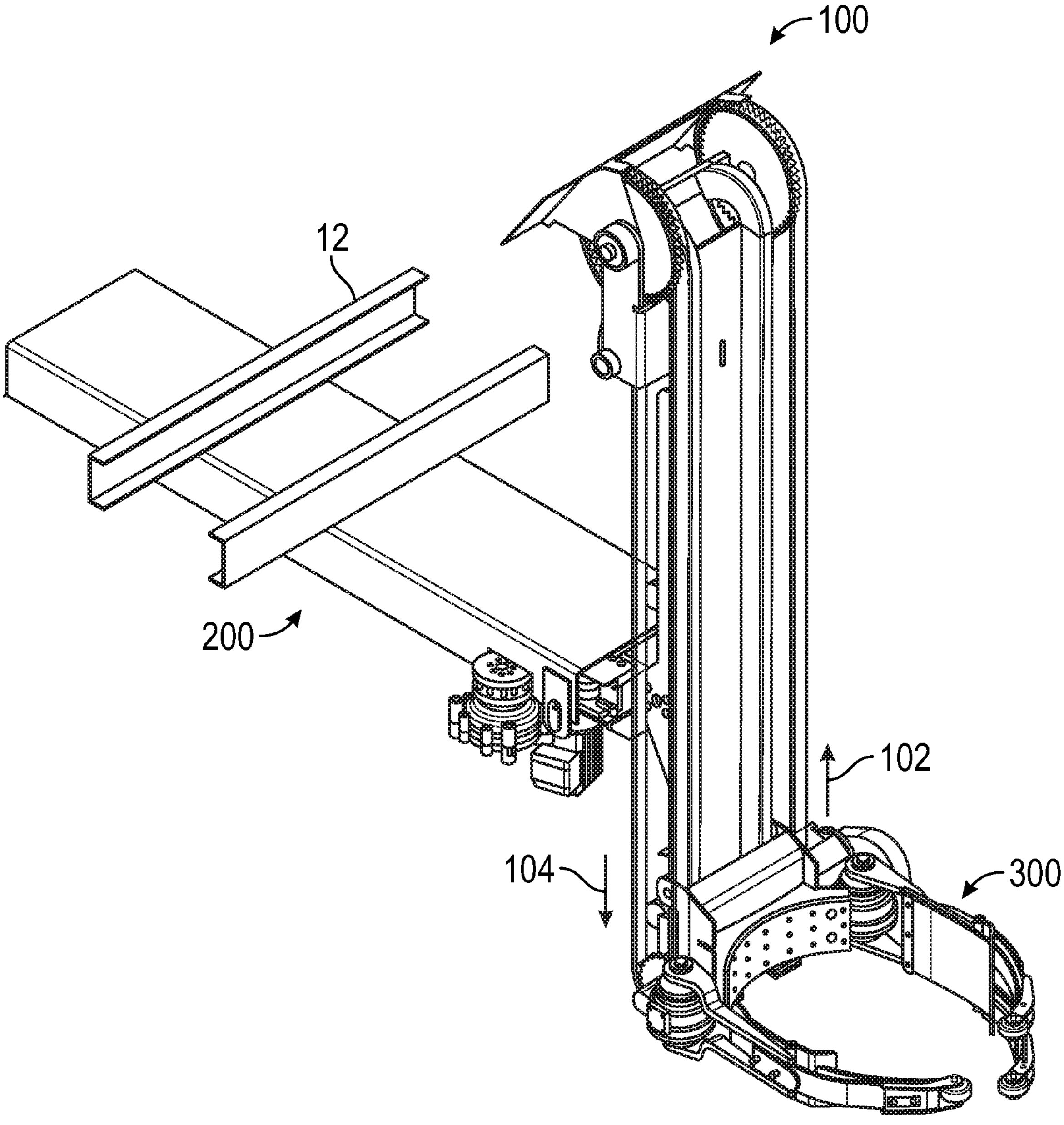
FIG. 2 is a perspective view of the side loading apparatus including an extension assembly and a lift assembly, according to some embodiments.

Referring to FIG. 2, the lift assembly 100 is shown coupled to an end of an extension assembly 200 (e.g., a reach assembly). The extension assembly 200 is coupled (e.g., fixed) with the frame 12 (e.g., a chassis of the refuse vehicle 10) and is configured to extend or retract the lift assembly 100 and therefore the grabber assembly 300 laterally outwards from the side of the refuse vehicle 10 to reach a refuse receptacle. In some embodiments, the extension assembly 200 is coupled with a portion of a fork of a front end loader refuse vehicle. The grabber assembly 300 is configured to travel in an upwards direction 102 along the lift assembly 100, and then travel in a downwards direction 104 along the lift assembly 100. In some embodiments, the lift assembly 100, the extension assembly 200, and the grabber assembly 300 are configured to perform a grasping, lifting, and dumping operation of a refuse container by (i) extending the extension assembly 200, (ii) grasping the refuse container with the grabber assembly 300 (e.g., between the grabber arms 306), (iii) retracting the extension assembly 200 to the refuse vehicle 10, (iv) lifting the grabber assembly 300 along the lift assembly 100 and dumping the contents of the refuse container, (v) returning the grabber assembly 300 to the ground, (vi) extending the extension assembly 200 and the grabber assembly 300 to its original location, and (vii) releasing the refuse container from the grabber assembly 300.

Figure 3:
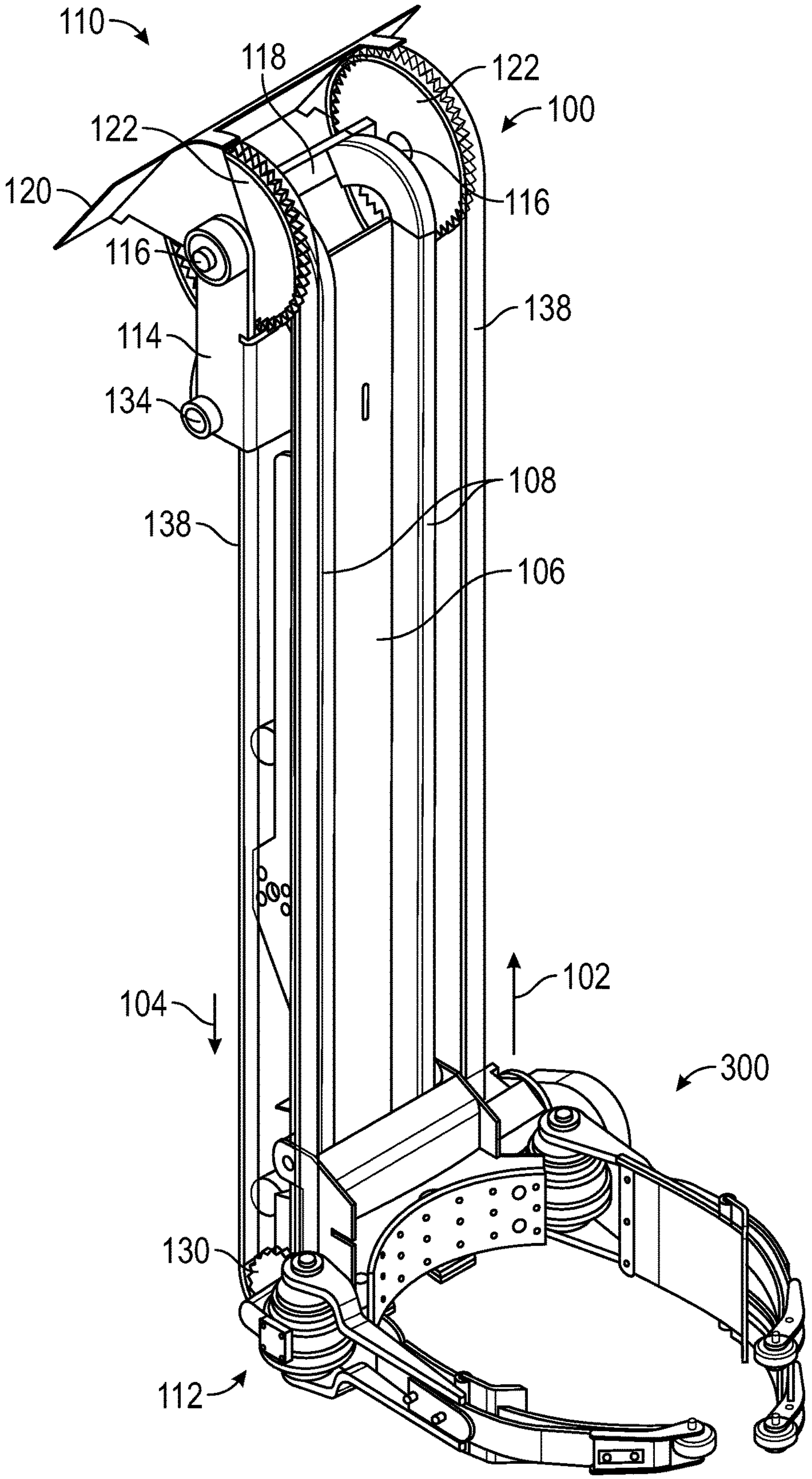
FIG. 3 is a perspective view of the lift assembly of FIG. 2 with a grabber assembly at a bottom position of the lift assembly, according to some embodiments.
Figure 4:
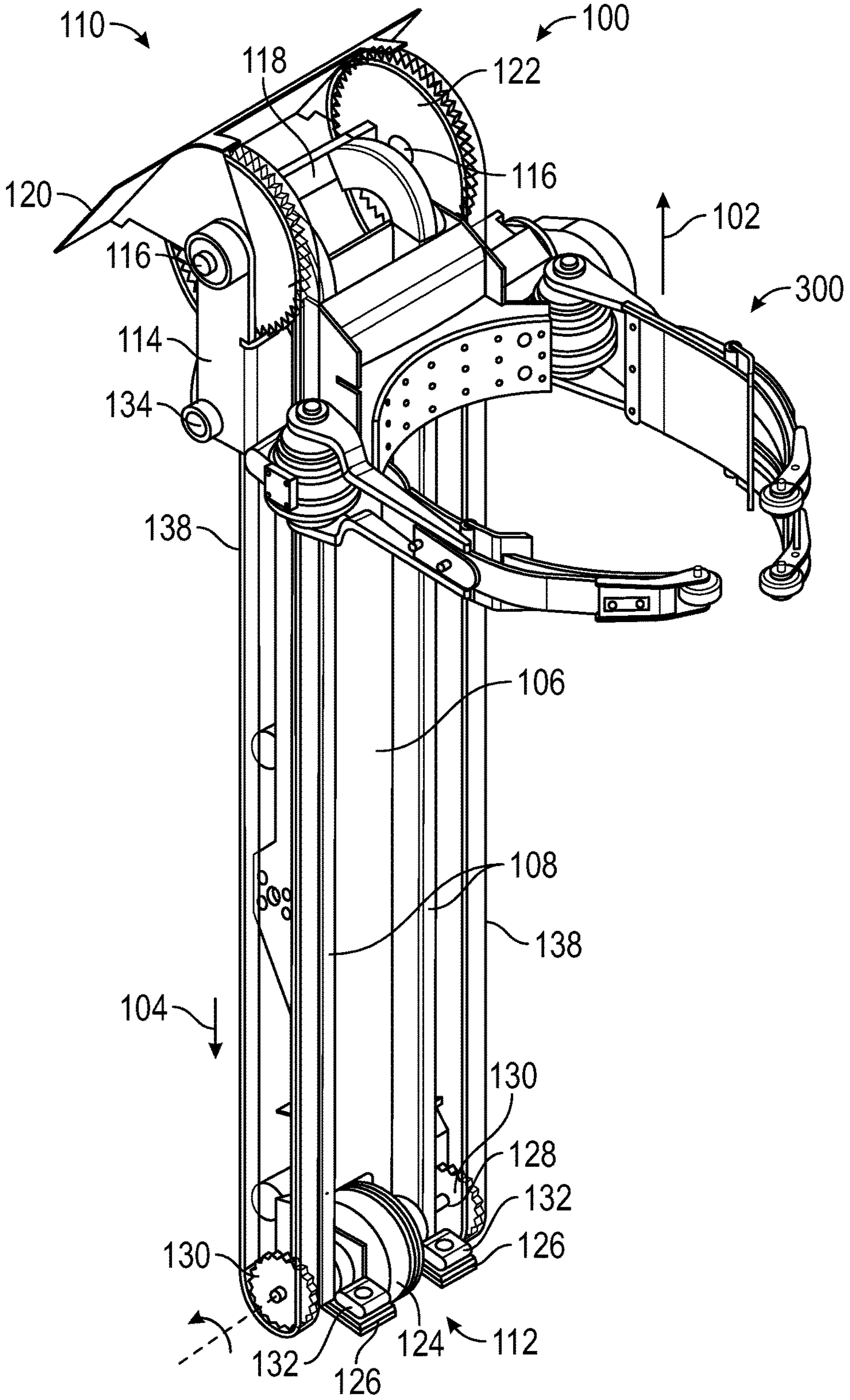
FIG. 4 is a perspective view of the lift assembly of FIG. 2 with the grabber assembly at an upper position of the lift assembly, according to some embodiments.
Figure 5:
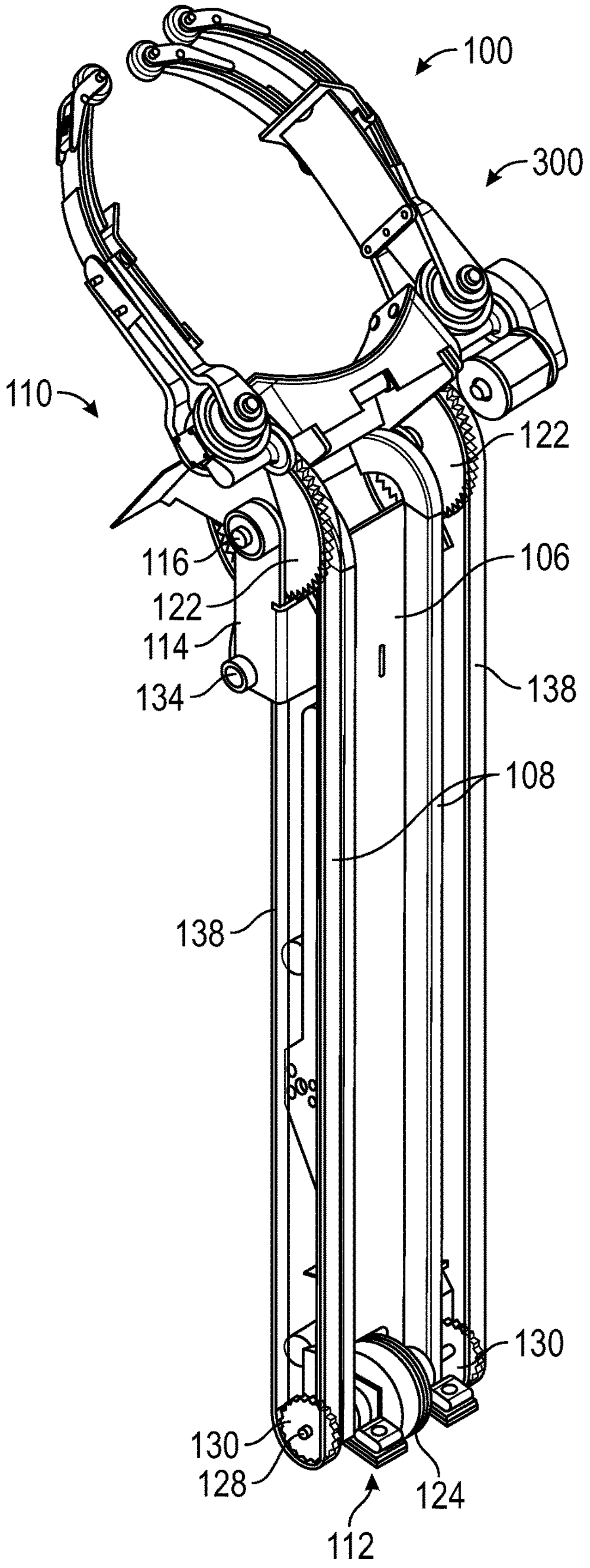
FIG. 5 is a perspective view of the lift assembly of FIG. 2 with the grabber assembly at a top position of the lift assembly, according to some embodiments.

Referring to FIGS. 3-5, the lift assembly 100 includes a main member 106 (e.g., a body, a body member, a track member, a carriage, a mast, etc.) along which a pair of track members 108 are positioned. The track members 108 may be positioned at opposite sides of the main member 106. In some embodiments, the main member 106 has a U-shape. In some embodiments, the main member 106 defines multiple inward facing surfaces and a space for a portion of the grabber assembly 300 to translate, travel, climb, or ascend along.

The lift assembly 100 includes a pair of drive sprockets 130 positioned at a bottom end 112 of the main member 106, and a pair of follower sprockets 122 or follower members (e.g., guides, pulleys, rollers, sprockets, etc.) positioned at an upper end 110 of the main member 106. In some embodiments, the lift assembly 100 includes a drive motor 124 positioned at the bottom end 112 of the main member 106. The drive motor 124 is configured to operate to drive a pair of drive shafts 128 upon which the drive sprockets 130 are mounted. The lift assembly 100 also includes a pair of tensile members (e.g., chains, ropes, cables, bands, etc.), shown as chains 138 that extend between the drive sprockets 130 and the follower sprockets 122. The chains 138 are configured to drive the grabber assembly 300 to ascend or descend the lift assembly 100. Advantageously, the drive motor 124 (e.g., an electric motor) that is configured to drive the grabber assembly 300 to travel along the lift assembly 100 is positioned on the main member 106 and is not positioned on the grabber assembly 300. Accordingly, the grabber assembly 300 has a reduced weight or lift mass as compared to lift assemblies that have the drive motor positioned on the grabber assembly 300.

The lift assembly 100 also includes a pair of feet 126 (e.g., protrusions, edges, projections, etc.) that extend outwards from the main member 106 at the bottom end 112 of the main member 106. In some embodiments, a pair of stoppers or rubber members 132 are coupled with the pair of feet 126 and are configured to engage a bottom portion or surface of the grabber assembly 300 when the grabber assembly 300 is at a bottom most position along the lift assembly 100.

The lift assembly 100 also includes a pair of frame members 114 positioned at the upper end 110 of the main member 106. The frame members 114 may support the follower sprockets 122 which are rotatably coupled with the frame member 114 at the upper end 110 of the main member through shafts 116. The shafts 116 can be coupled with the frame members 114 through bearings to facilitate rotation of the follower sprockets 122. The lift assembly 100 also includes a bar 118 that extends between opposite sides of the main member 106 (e.g., between the pair of track members 108) to define a stopping surface for the grabber assembly 300 when the grabber assembly 300 reaches the upper end 110 of the lift assembly 100. In some embodiments, the lift assembly 100 also includes a shield 120 that extends between the follower sprockets 122. The shield 120 may define a boundary or surface that is sloped (e.g., towards an opening of the refuse compartment 30) so that refuse that falls out of the refuse container during dumping or emptying of the refuse container at the upper end 110 of the lift assembly 100 does not fall onto the lift assembly 100 (e.g., onto the chains 138, the follower sprockets 122, etc.). In some embodiments, the bar 118 facilitates limiting further linear motion or hinging of the carriage 304 at the upper end 110 of the lift assembly 100.

Figure 6:
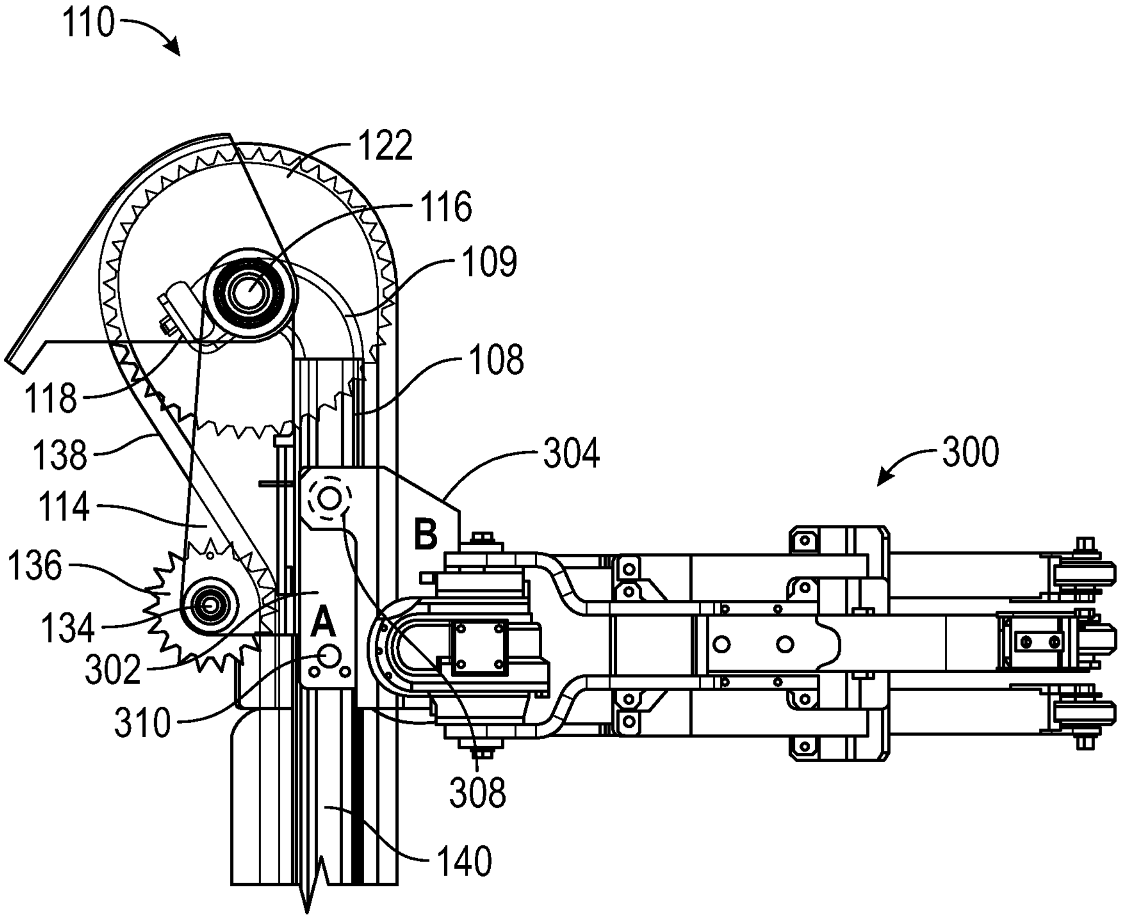
FIG. 6 is a side view of a portion of the lift assembly of FIG. 2 as the grabber assembly approaches the top position, according to some embodiments.
Figure 7:
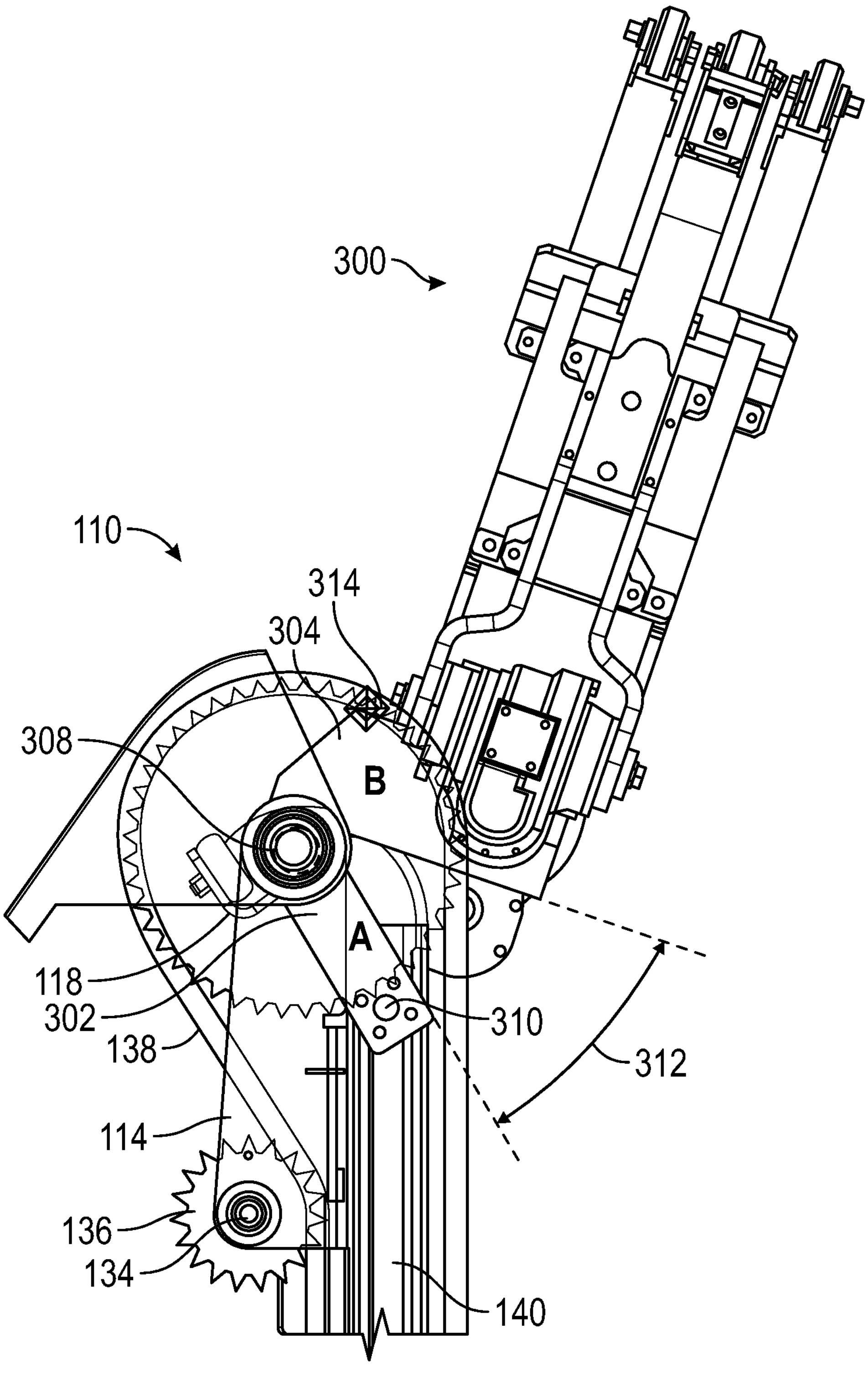
FIG. 7 is a side view of a portion of the lift assembly of FIG. 2 as the grabber assembly approaches the top position and begins a dumping operation, according to some embodiments.
Figure 8:
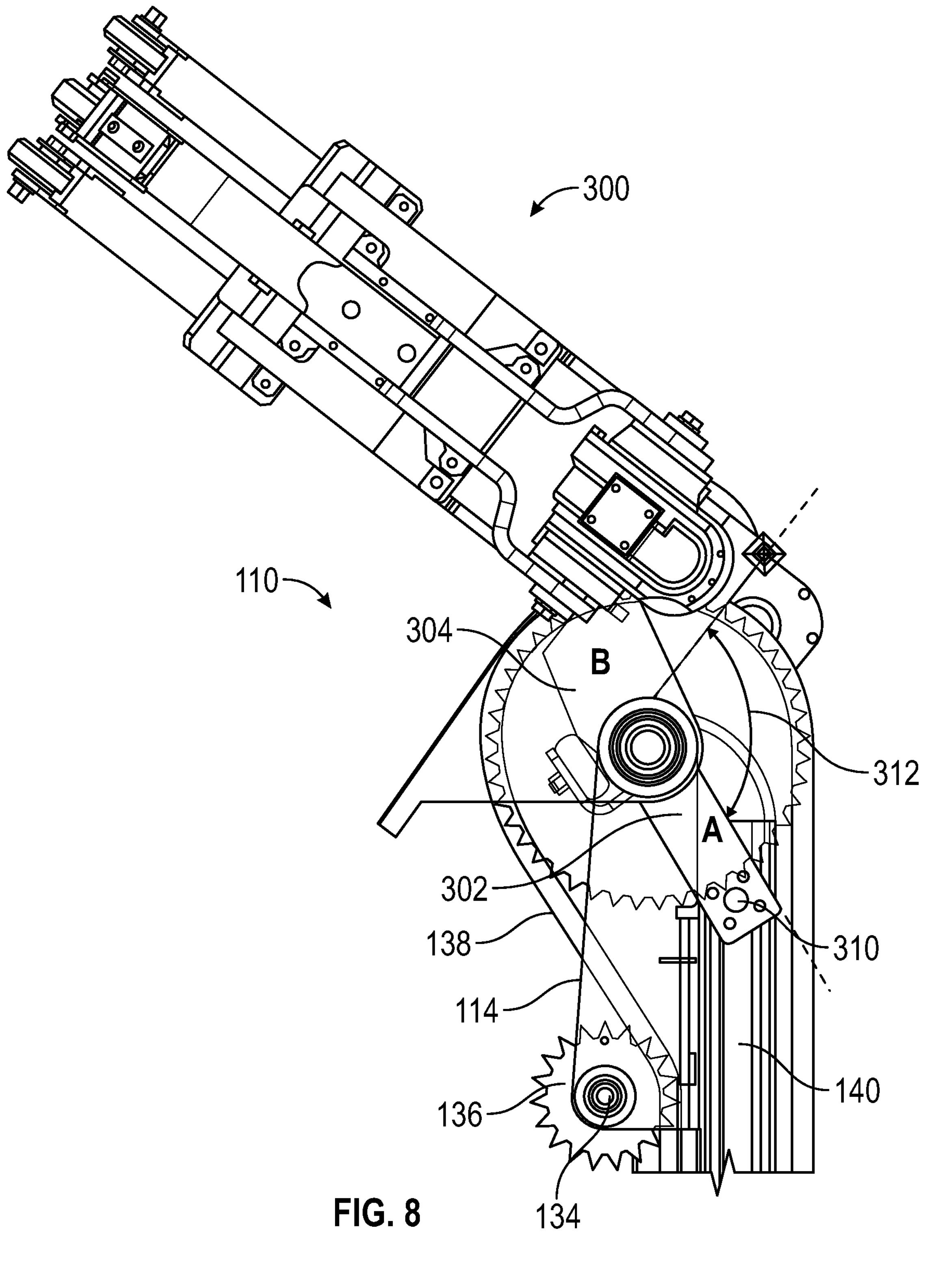
FIG. 8 is a side view of a portion of the lift assembly of FIG. 2 as the grabber assembly reaches the top position and completes the dumping operation, according to some embodiments.

Referring to FIGS. 6-8, the lift assembly 100 includes a second pair of follower sprockets 136 that are rotatably coupled with the follower shafts 134 to the frame members 114 at a position rearward of the track members 108. In some embodiments, the second pair of follower sprockets 136 are configured to engage an opposite side of the chains 138 as the follower sprockets 122 and the drive sprockets 130. The second pair of follower sprockets 136 facilitate maintaining a thin profile of the chains 138 along the lift assembly 100 (e.g., alongside the track members 108).

The lift assembly 100 may include curved track members 109 that are positioned at an upper most or top end of the track members 108. In some embodiments, the curved track members 109 and the track members 108 define a groove, a channel, etc., shown as track 140 that has a J-shape (e.g., including a straight portion along the track members 108 and a curved portion along the curved track members 109). In some embodiments, a linkage 302 of the grabber assembly 300 is configured to follow along the track 140 (e.g., slide along the track 140). The linkage 302 may include a first member 308 (e.g., a slider bearing, a roller bearing, a block, etc.) and a second member 310. The first member 308 and the second member 310 may be received within the track 140 and are configured to slide along the track 140. In some embodiments, the curved track members 109 define a curved channel having a channel width that is greater than the channel width of the track 140 along the track members 108.

Referring still to FIGS. 6-8, the grabber assembly 300 includes a carriage 304 that is pivotally coupled with the linkage 302 at the first member 308. In some embodiments, the carriage 304 is pivotally coupled with the chains 138 at an engagement point 314 such that the chains 138, when driven, drive the carriage 304 and the grabber assembly 300 to ascend or descend the track 140. In some embodiments, the carriage 304 may lay flat along the linkage 302 as the grabber assembly 300 transports along the track members 108 as shown in FIG. 6. When the grabber assembly 300 ascends to the upper end 110, the linkage 302 may be guided along the curved portion of the track 140, thereby resulting in a moment arm or distance between the first member 308 and the engagement point 314. As the chains 138 pull the carriage 304 at the engagement point 314, the carriage 304 is driven to tilt, thereby creating an angle 312 between the carriage 304 and the linkage 302 and causing the angle 312 to increase so that the refuse container that is grasped by the arms 306 empties contents of the refuse container into the refuse compartment 30. The drive motor 124 may then operate or control a descent of the grabber assembly 300 down the lift assembly 100 to the bottom end 112.

Extension Assembly

Figure 9:
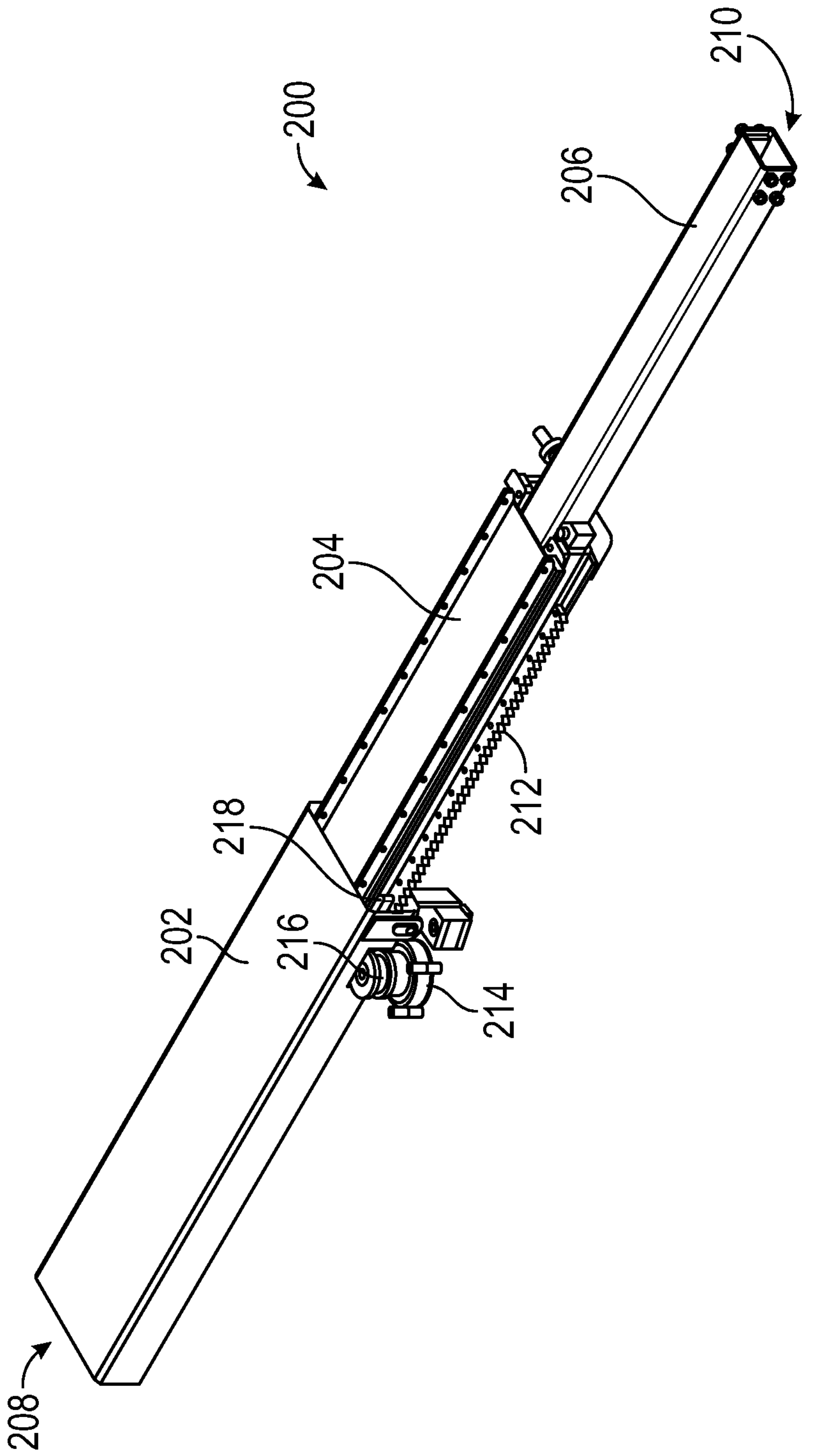
FIG. 9 is a perspective view of the extension assembly of FIG. 2, according to some embodiments.

Referring to FIGS. 2 and 9, the extension assembly 200 may include a first member 202 (e.g., a first section, a fixed section, a fixed member, a receiving member, a telescoping member, etc.) that is fixedly coupled with the frame 12 of the refuse vehicle 10, a second member 204 (e.g., a medial member, a telescoping member, an intermediate member, a second section, etc.), and a third member 206 (e.g., a fly section, a distal member, an outer most member, a telescoping member, etc.). In some embodiments, the first member 202 is fixedly coupled with the frame 12 at an underside of the frame 12 such that the extension assembly 200 extends laterally outwards from the side of the refuse vehicle 10 at a position beneath the frame 12 or the body 14 of the refuse vehicle 10. In some embodiments, a first end 208 (e.g., a refuse end, a proximate end, a fixed end, etc.) of the extension assembly 200 is positioned beneath the refuse vehicle 10, and the lift assembly 100 and the grabber assembly 300 are mounted or coupled (e.g., fixedly coupled, mounted, rotatably coupled, pivotally coupled, adjustably coupled, etc.) on the third member 206 at a second end 210 of the extension assembly 200. In some embodiments, the second member 204 is configured to be received within an inner volume of the first member 202 and can be driven to extend or retract out of an opening of the first member 202. The third member 206 is similarly configured to be received within an inner volume of the second member 204 and is configured to extend or retract out of an opening of the second member 204 in a same direction as the second member 204 telescopes out of the first member 202, to thereby increase or decrease an overall length of the extension assembly 200, and laterally translate the lift assembly 100 and the grabber assembly 300 away from a side of the refuse vehicle 10.

Figure 10:
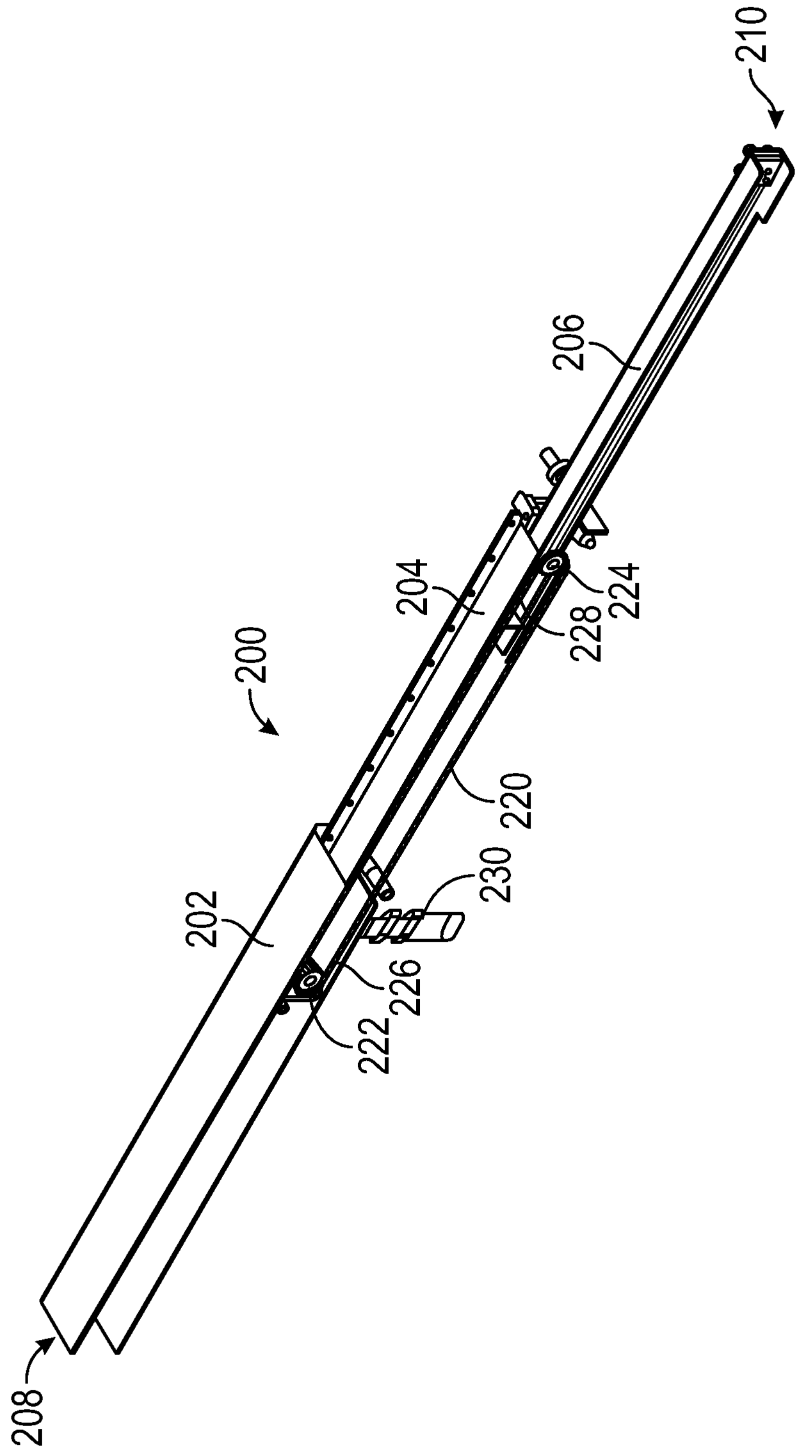
FIG. 10 is a perspective sectional view of the extension assembly of FIG. 2, according to some embodiments.

Referring to FIGS. 9 and 10, the second member 204 includes a rack 212 (e.g., a plurality of teeth) that extends lengthwise along a side of the second member 204. In some embodiments, the rack 212 is disposed in a longitudinal array and extends longitudinally along an outer surface of the second member 204. The extension assembly 200 also includes a rack motor 214 (e.g., an electric motor) configured to drive a pinion 216 which engages the rack 212 of the second member 204. A sensor 218 is coupled to the first member 202 and measures the status of the extension assembly 200. In some embodiments, the rack motor 214 and the pinion 216 are fixedly coupled with the first member 202 at an end of the first member 202 from which the second member 204 telescopes. In some embodiments, the pinion 216 is configured to access and engage with the rack 212 through a window or opening of the first member 202. The rack motor 214 may be configured to operate the second member 204 to extend or retract relative to the first member 202, which in turn drives the third member 206 to extend or retract relative to the second member 204. In this way, the rack motor 214 may be operated to drive extension or retraction of the entire extension assembly 200. In some embodiments, the rack motor 214 is operationally coupled with a controller or sensor and is configured to operate the extension assembly 200 to extend or retract based on a user input, sensor data that indicates a current amount of extension of the extension assembly 200, a predetermined function, a mode of operation of the refuse vehicle 10, etc.

The rack motor 214 is fixedly coupled with the first member 202 and drives the pinion 216 which engages the rack 212 of the second member 204 to thereby drive the second member 204 to linearly extend or retract relative to the first member 202. In some embodiments, the extension assembly 200 also includes a tensile member (e.g., a cable, a filament, a rope, a chain, etc.), shown as chain 220, which engages or is wound around a first guide (e.g., a roller, a smooth shaft, a pulley, a sprocket, a bearing, etc.), shown as first sprocket 222 (e.g., a gear), at a first or inner end of the second member 204, and a second guide (e.g., a roller, a smooth shaft, a pulley, a sprocket, a bearing, etc.), shown as second sprocket 224, at a second or outer end of the second member 204. In some embodiments, the first sprocket 222 and the second sprocket 224 are positioned within an inner volume of the second member 204. The first sprocket 222 and the second sprocket 224 are translatably fixedly coupled (e.g., mounted) and configured to rotate relative to the second member 204. In some embodiments, the chain 220 is fixedly coupled (e.g., secured, fastened, attached, etc.) with the first member 202 at a first point 226, and is fixedly coupled (e.g., secured, fastened, attached, etc.) with the third member 206 at a second point 228 along the chain 220. In some embodiments, the extension assembly 200 includes an electric brake 230 that is mounted on the first member 202 and configured to operate to engage the second member 204 to thereby lock a current extension position of the second member 204 relative to the first member 202.

In some embodiments, relative motion of the second member 204 relative to the first member 202 causes a same amount of motion relative between the third member 206 and the second member 204 due to motion of the chain 220 and fixed coupling of the chain 220 with the first member 202 at the first point 226 and fixed coupling of the chain 220 with the third member 206 at the second point 228. Advantageously, the extension assembly 200 includes a single drive motor, rack motor 214, which can operate to drive both the second member 204 to linearly translate relative to the first member 202 and to drive the third member 206 to linearly translate relative to the second member 204.

Figure 12:
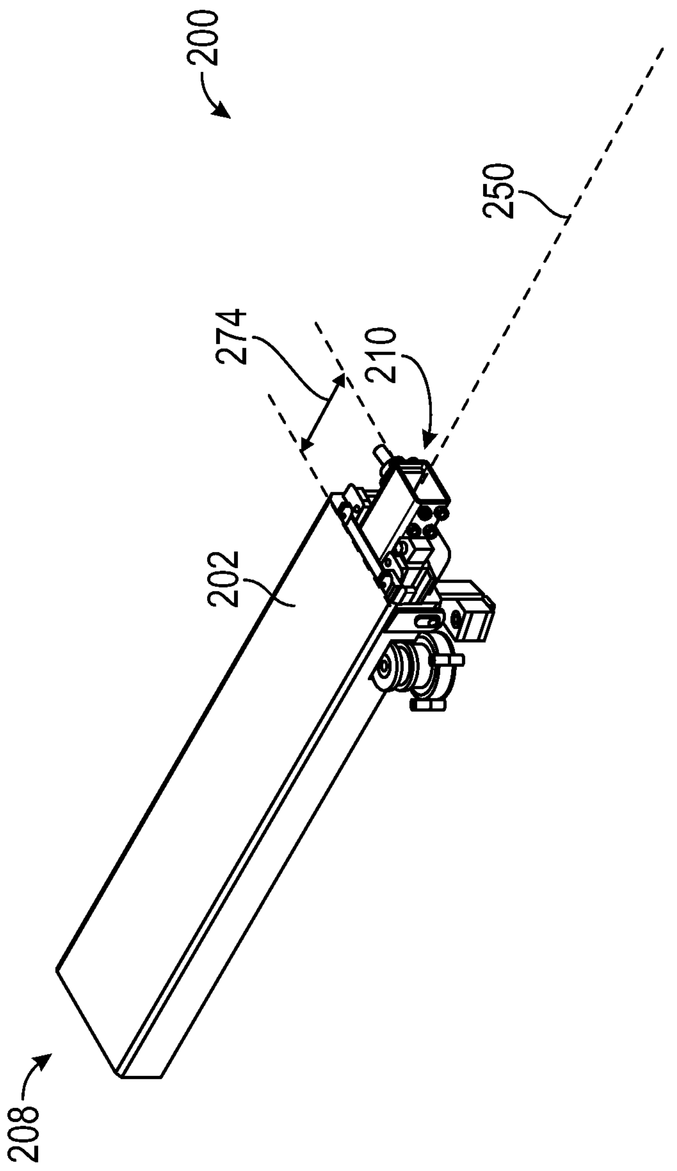
FIG. 12 is a perspective view of the extension assembly of FIG. 2 at a fully retracted position, according to some embodiments.
Figure 13:
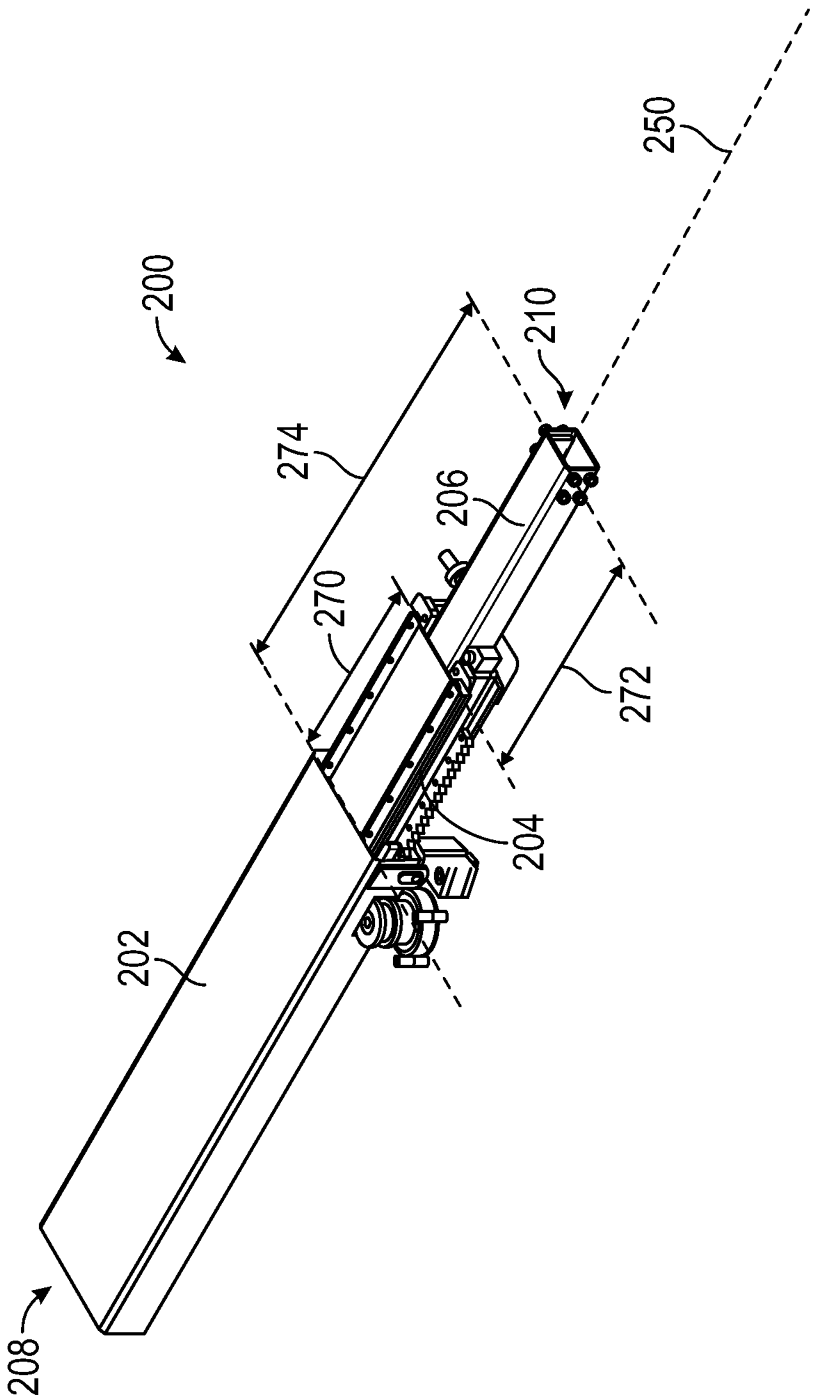
FIG. 13 is a perspective view of the extension assembly of FIG. 2 at a partially extended position, according to some embodiments.
Figure 14:
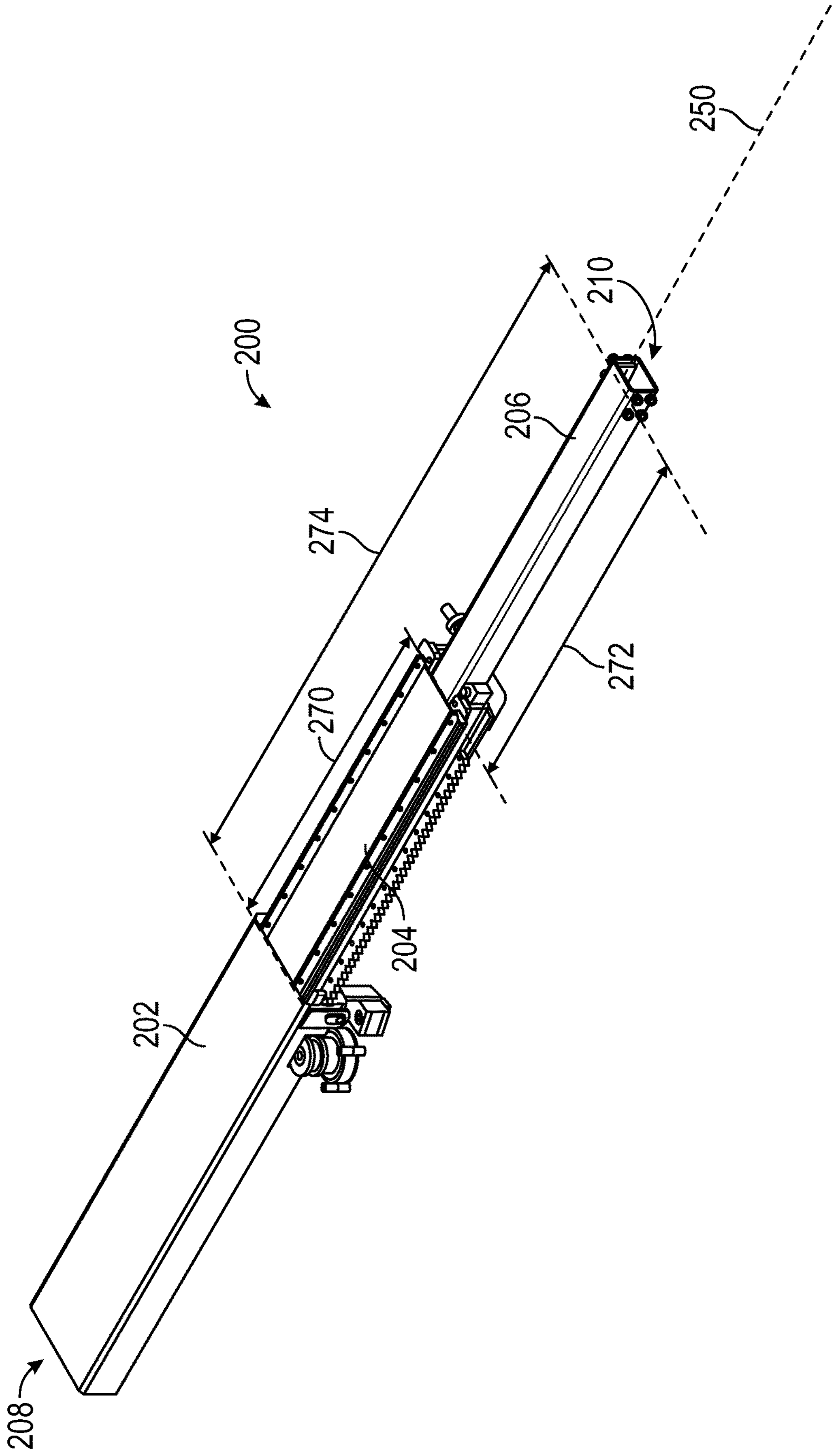
FIG. 14 is a perspective view of the extension assembly of FIG. 2 at a fully extended position, according to some embodiments.

Referring to FIGS. 12-14, the extension assembly 200 is configured to operate to extend or retract to thereby increase or decrease a distance 274 defined between an end of the first member 202 and an end of the third member 206 (e.g., the second end 210) at which the lift assembly 100 and the grabber assembly 300 are coupled to reach a refuse container. In some embodiments, the distance 274 is measured along a longitudinal axis 250 that extends laterally relative to the refuse vehicle 10. In some embodiments, the distance 274 is defined as a sum of a distance 270 and a distance 272. The distance 270 is defined between the first member 202 and the end of the second member 204 and indicates an amount of extension or retraction of the second member 204 relative to the first member 202. The distance 272 is defined between the end of the second member 204 and the end of the third member 206 and indicates an amount of extension or retraction of the third member 206 relative to the second member 204. In some embodiments, the extension assembly 200 is configured to increase or decrease the distance 270 and the distance 272 at a same rate, such that the overall rate of change of the distance 274 is twice the rate of change of the distance 270, or the distance 272.

Figure 11:
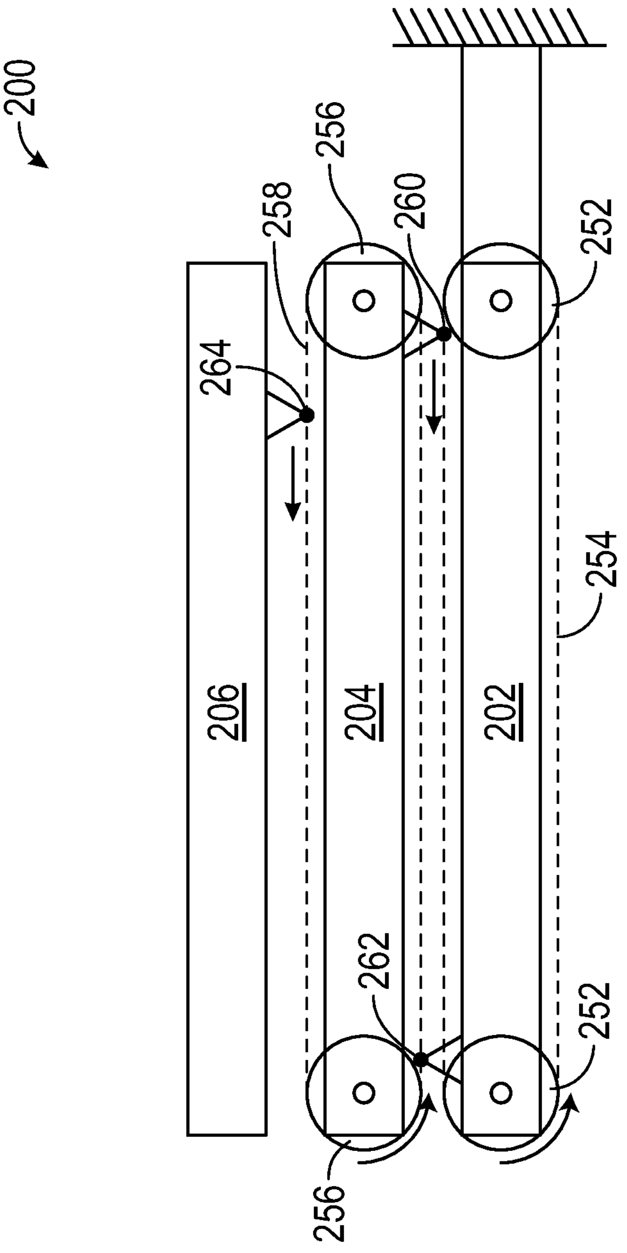
FIG. 11 is a diagram of the extension assembly of FIG. 2, according to some embodiments.

Referring particularly to FIG. 11, a diagram of the extension assembly 200 illustrates the operation of the extension assembly 200, with the rack 212 and the pinion 216 visualized as a pulley or chain and sprocket system. In some embodiments, the rack 212 and the pinion 216 are replaceable with a chain and sprocket system similar to the chain 220 and the first sprocket 222 and the second sprocket 224. The first member 202 is shown fixedly coupled (e.g., with the frame 12 of the refuse vehicle 10) and includes sprockets 252 positioned at opposite ends of the first member 202, with a tensile member, shown as chain 254, extending between and engaging the sprockets 252. In some embodiments, one of the sprockets 252 may be driven (e.g., by an electric motor) and the sprocket 252 may be a follower or idler sprocket.

The second member 204 also includes sprockets 256 and a tensile member, shown as chain 258, that extends around and engages the sprockets 256. In some embodiments, the first member 202 is fixed with the chain 258 at a connection point 262, and the second member 204 is fixed with the chain 254 at a connection point 260. The third member 206 is fixed with the chain 258 at a connection point 264. In this way, as the chain 254 is driven, the second member 204 is driven to linearly translate relative to the first member 202, which in turn causes a same amount of linear translation of the third member 206 relative to the second member 204.

Grabber Assembly

Referring to FIGS. 1-14, the grabber assembly 300 may be the same as or similar to the grabber assembly described with reference to FIGS. 20-22 of U.S. application Ser. No. 16/851,162, filed Apr. 17, 2020, the entire disclosure of which is incorporated by reference herein. The grabber assembly 300 may include a worm drive and a single motor for operating actuation of the grabber arms 306. In some embodiments, the grabber assembly 300 does not include a motor for transporting the grabber assembly 300 along the lift assembly 100 to thereby reduce weight of the grabber assembly 300.

Figure 15:
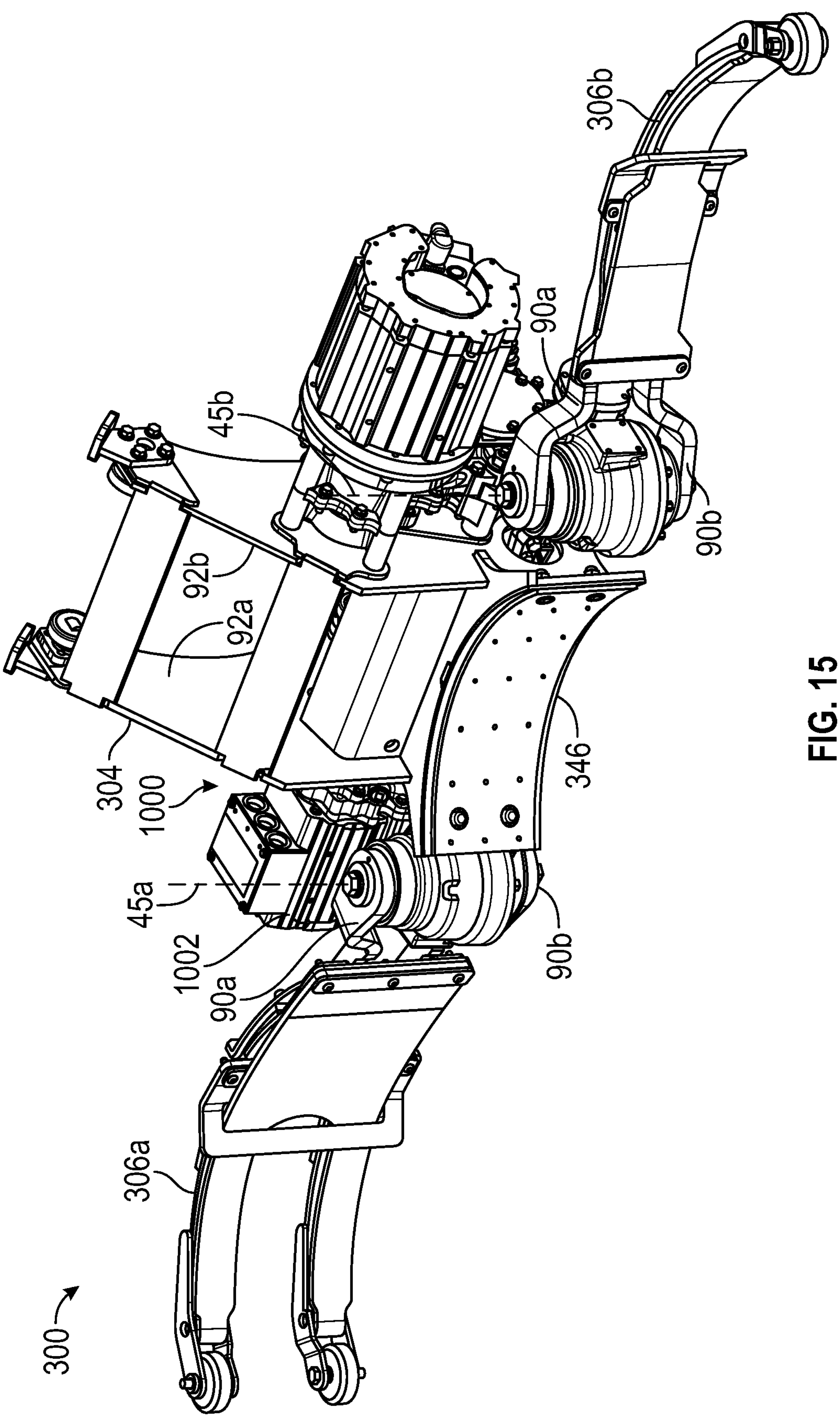
FIG. 15 is a perspective view of the grabber assembly of FIG. 3, according to some embodiments.
Figure 16:
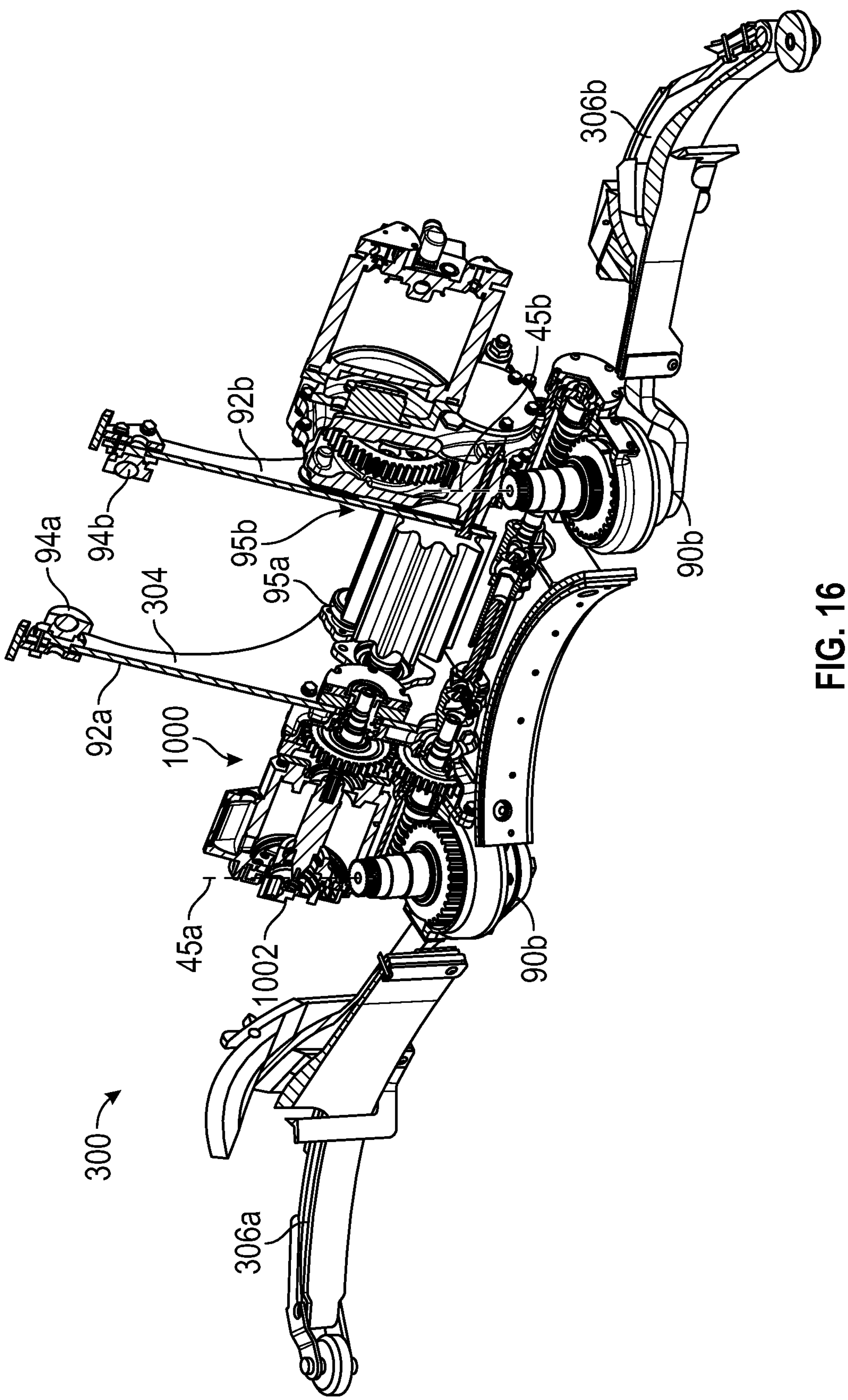
FIG. 16 is a perspective sectional view of the grabber assembly of FIG. 3, according to some embodiments.
Figure 17:
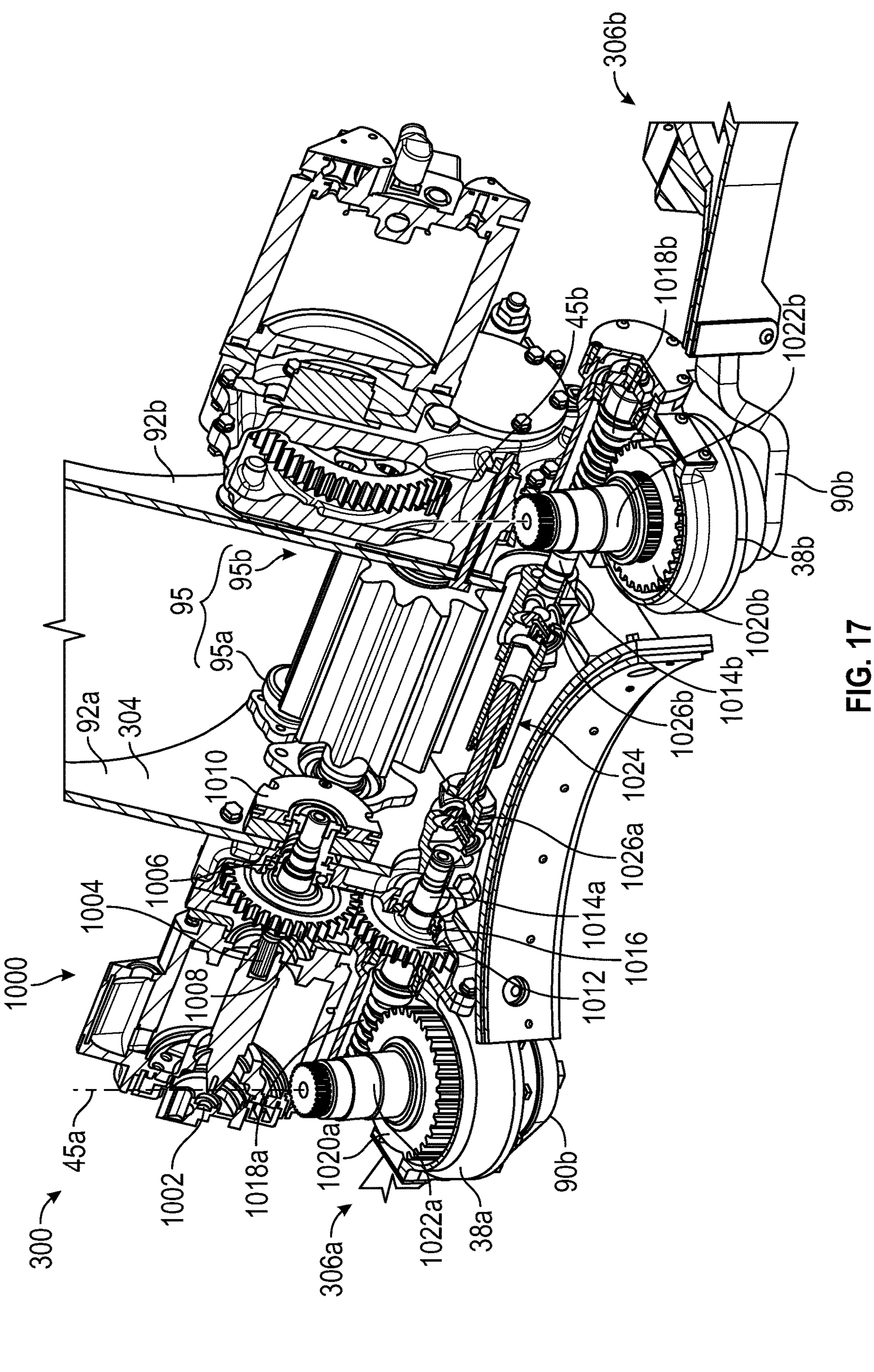
FIG. 17 is a perspective sectional view of a portion of the grabber assembly of FIG. 3, according to some embodiments.

Referring particularly to FIGS. 15-17, the grabber assembly 300 is shown according to some embodiments. The grabber assembly 300 includes a first grabber arm 306*a*, a second grabber arm 306*b*, a body 346, and a carriage 304. The first grabber arm 306*a* is configured to rotatably or pivotally couple with the body 346 such that the first grabber arm 306*a* can rotate or pivot relative to body 346 about the first axis, shown as axis 45*a*. Likewise, the second grabber arm 306*b* is configured to rotatably or pivotally couple with the body 346 such that second grabber arm 306*b* can rotate or pivot relative to body 346 about a second axis, shown as axis 45*b*.

The grabber assembly 300 can include an electric gripping motor system 1000. The electric gripping motor system 1000 includes an electric motor, shown as gripping motor 1002 that is configured to operate to drive the first grabber arm 306*a* and the second grabber arm 306*b* to pivot or rotate relative to the body 346 about the axis 45*a* and the axis 45*b*, respectively.

The carriage 304 can include a first lateral member 92*a* and a second lateral member 92*b* that are spaced a distance apart. The first lateral member 92*a* and the second lateral member 92*b* are substantially parallel with each other and spaced apart so that the first lateral member 92*a* may be positioned outside of the track 20, shown in FIG. 1, at a first lateral side of the track 20, and so that the second lateral member 92*b* may be positioned outside of the track 20 at a second lateral side of the track 20. Referring specifically to FIG. 16, the first lateral member 92*a* includes a first roller 94*a* and the second lateral member 92*b* includes a second roller 94*b*. The first roller 94*a* and the second roller 94*b* can be rotatably coupled with the first lateral member 92*a* and the second lateral member 92*b*, respectively, so that as the grabber assembly 300 ascends or descends along track 20, the first roller 94*a* and the second roller 94*b* rotate. In some embodiments, the first roller 94*a* and the second roller 94*b* are fixedly coupled with the first lateral member 92*a* and the second lateral member 92*b*, respectively. The first roller 94*a* can be received within a corresponding groove, track, recess, etc., of the track 20 (e.g., recess 96*a* shown in FIG. 17) and the second roller 94*b* can be received within a corresponding groove, track, recess, etc., of track 20 on an opposite lateral side of track 20 (e.g., recess 96*b* as shown in FIG. 17). The first roller 94*a* and the second roller 94*b* can be positioned at an upper end, or an upper portion of carriage 304. Carriage 304 can also include a second pair of rollers 95, shown as a first roller 95*a* and a second roller 95*b*, that are positioned at a lower end or lower portion of carriage 304 and are similarly configured to engage, be received within, etc., the tracks, grooves, recesses, etc., of track 20.

Referring particularly to FIG. 16, the electric gripping motor system 1000 includes the gripping motor 1002, an output driveshaft 1004, an output gear 1008, a driven gear 1012, and an electric brake 1010. The electric gripping motor system 1000 also includes a medial or an intermediate shaft assembly 1024 that is configured to deliver or transfer power provided by the gripping motor 1002 to the first grabber arm 306*a* and the second grabber arm 306*b* to drive the first grabber arm 306*a* and the second grabber arm 306*b* to pivot about the axis 45*a* and the axis 45*b*, respectively (e.g., to grasp and/or release a container or refuse bin).

The gripping motor 1002 is configured to operate to generate or provide rotational kinetic energy or torque that is transferred through the output driveshaft 1004. The output driveshaft 1004 may be rotatably coupled with the carriage 304 (e.g., the first lateral member 92*a*) through a bearing 1006 so that the output driveshaft 1004 is supported by the carriage 304 and can rotate relative to the carriage 304. In some embodiments, the output driveshaft 1004 is configured to be selectively engaged by the electric brake 1010. For example, the electric brake 1010 can receive an electrical current or electrical power from a battery, a power storage device, etc., of the refuse vehicle 10 and operate to engage, lock, interface with, etc., the output driveshaft 1004 so that the output driveshaft 1004 is locked at a current angular position or to restrict or prevent rotation of the output driveshaft 1004. In some embodiments, the electric brake 1010 is able to transition between a first position (e.g., an unlocked position) so that rotation of the output driveshaft 1004 is not limited (e.g., the output driveshaft 1004 is freely driven by the gripping motor 1002) and a second position (e.g., a locked position) so that rotation of the output driveshaft 1004 is limited, prevented, restricted, etc. (e.g., so that the output driveshaft 1004 is limited in its rotation or maintained at a current angular position or maintained within a specific angular range). The electric brake 1010 can transition between the first position and the second position in response to receiving a signal from the controller of the refuse vehicle 10.

The output gear 1008 engages, meshes with, etc., the driven gear 1012 and transfers rotational kinetic energy or torque to the driven gear 1012. The output gear 1008 and the driven gear 1012 can be spur gears, helical gears, etc., or any other types of gears. The driven gear 1012 may be rotatably coupled with a first shaft 1014*a*. In some embodiments, the first shaft 1014*a* is rotatably coupled with the carriage 304

(e.g., the first lateral member 92*a*) through a bearing 1016 so that the first shaft 1014*a* can rotate relative to the carriage 304. The first shaft 1014*a* includes a first end and a second end. The first end of the first shaft 1014*a* can include screw threads, worm threads, a worm drive, etc., shown as a first worm 1018*a*. The first worm 1018*a* is configured to engage, mesh with, etc., a first worm gear 1020*a* that is rotatably fixedly coupled with a first grabber arm shaft 1022*a*. The first grabber arm shaft 1022*a* can be the same as or similar to first bushing 54*a*. In some embodiments, the first grabber arm shaft 1022*a* is the same as or similar to adapter assembly pin 60*a*.

The first grabber arm shaft 1022*a* may define the axis 45*a*. In some embodiments, the first grabber arm shaft 1022*a* is fixedly coupled at opposite ends with a first control arm 90*a* and a second control arm 90*b* of the first grabber arm 306*a* (shown in FIGS. 15-17). The first grabber arm shaft 1022*a* can be rotatably supported within a first housing or a first structural member 38*a* that is fixedly coupled with the body 346 and/or the carriage 304. In some embodiments, the first grabber arm shaft 1022*a* is rotatably coupled with the first structural member 38*a* through one or more bearings.

In this way, the gripping motor 1002 may be operated to drive the first grabber arm 306*a* to rotate about the axis 45*a* to grasp, grip, or otherwise removably couple with a container. The gripping motor 1002 outputs rotational kinetic energy or torque through the output driveshaft 1004 which is transferred to the output gear 1008. The output gear 1008 drives the driven gear 1012 which is rotatably coupled with first shaft 1014*a* so that rotational kinetic energy is transferred through driven gear 1012 to first shaft 1014*a*. The first shaft 1014*a* rotates to drive the first worm gear 1020*a*, the first grabber arm shaft 1022*a*, the first control arm 90*a*, the second control arm 90*b*, and the first grabber arm 306*a* to rotate about the axis 45*a* (e.g., to grasp and release a refuse container). The gripping motor 1002 can operate to drive the output driveshaft 1004 in a first direction to drive the first grabber arm 306*a* to rotate about the axis 45*a* in a first direction (e.g., inwards, counter-clockwise, etc.) to grasp a container and can operate to drive the output driveshaft 1004 in a second direction to drive the first grabber arm 306*a* to rotate about the axis 45*a* in a second or opposite direction (e.g., outwards, clockwise, etc.) to release a container.

In some embodiments, the first shaft 1014*a* extends in a direction that is substantially orthogonal or perpendicular to the axis 45*a*. The first shaft 1014*a* can rotatably couple (e.g., fixedly) with the intermediate shaft assembly 1024 through a first universal joint 1026*a*. The intermediate shaft assembly 1024 rotatably couples with the first shaft 1014*a* through the first universal joint 1026*a* at a first end of the intermediate shaft assembly 1024, and rotatably couples with a second shaft 1014*b* through a second universal joint 1026*b* at a second, opposite, or distal end of the intermediate shaft assembly 1024. The second universal joint 1026*b* can be the same as or similar to the first universal joint 1026*a* and/or may be mirrored so that whatever is said of the first universal joint 1026*a* may be said of the second universal joint 1026*b*. The second shaft 1014*b* can be the same as or similar to the first shaft 1014*a* so that whatever is said of the first shaft 1014*a* may be said of the second shaft 1014*b* and vice versa.

The second shaft 1014*b* includes a second worm 1018*b* that is the same as or similar to first worm 1018*a*. In some embodiments, the second worm 1018*b* has a thread direction that is opposite a thread direction of the first worm 1018*a*. The second worm 1018*b* is configured to engage, mesh with, etc., a second worm gear 1020*b*. The second worm gear 1020*b* can be the same as or similar to the first worm gear 1020*a*. The second worm gear 1020*b* receives rotational kinetic energy or torque from the second worm 1018*b* so that the second worm gear 1020*b* rotates about the axis 45*b*. The second worm gear 1020*b* is fixedly coupled with a second grabber arm shaft 1022*b* that is fixedly coupled with a first control arm 90*a* and second control arm 90*b* of the second grabber arm 306*b* (e.g., at opposite ends of second grabber arm shaft 1022*b*). In this way, the gripping motor 1002 can be used to drive both the first grabber arm 306*a* and the second grabber arm 306*b* to rotate about the axis 45*a* and the axis 45*b*, respectively. Specifically, the intermediate shaft assembly 1024 facilitates providing rotational kinetic energy or torque for both the first grabber arm 306*a* and the second grabber arm 306*b*.

The second grabber arm shaft 1022*b* may define the axis 45*b*. In some embodiments, the second grabber arm shaft 1022*b* is fixedly coupled at opposite ends with the first control arm 90*a* and the second control arm 90*b* of the second grabber arm 306*b* (shown in FIGS. 15-17). The second grabber arm shaft 1022*b* can be rotatably supported within a second housing or a second structural member 38*b* that is fixedly coupled with the body 346 and/or the carriage 304. In some embodiments, the second grabber arm shaft 1022*b* is rotatably coupled with the second structural member 38*b* through one or more bearings.

In some embodiments, the first universal joint 1026*a* and the second universal joint 1026*b* are optional. For example, the intermediate shaft assembly 1024 may extend in a direction between the first worm 1018*a* and the second worm 1018*b* without the first universal joint 1026*a* and the second universal joint 1026*b*. In some embodiments, the first worm 1018*a* and the second worm 1018*b* are formed directly or integrally formed with opposite ends of the intermediate shaft assembly 1024. The first universal joint 1026*a* and the second universal joint 1026*b* can facilitate accounting for any misalignment between the first worm 1018*a* and the second worm 1018*b*.

In other embodiments, the electric gripping motor system 1000 includes a first gripping motor 1002 and a second gripping motor 1002. The first gripping motor 1002 can be configured to drive the first grabber arm 306*b* to rotate about the axis 45*a* as shown in FIG. 17 without the intermediate shaft assembly 1024. The second gripping motor 1002 can be configured to independently drive the second grabber arm 306*b* to rotate about the axis 45*b* using a gear train similar to the output driveshaft 1004, the output gear 1008, the driven gear 1012, the first shaft 1014*a*, the first worm 1018*a*, and the first worm gear 1020*a*. In this way, a similar but mirrored gear train can be provided on an opposite side of the grabber assembly 300 with its own gripping motor 1002 for independently driving the second grabber arm 306*b*. The first gripping motor 1002 and the second gripping motor 1002 can operate cooperatively to independently drive each of the first grabber arm 306*a* and the second grabber arm 306*b* to grasp and release refuse containers.

In some embodiments, the first worm 1018*a* and the second worm 1018*b* function to provide locking functionality or to reduce a likelihood that the grabber arms 306 back-drive. For example, the first worm 1018*a* and the second worm 1018*b* may transfer rotational kinetic energy to the first worm gear 1020*a* and the second worm gear 1020*b*, respectively, to pivot the grabber arms 306 about the axis 45*a* and the axis 45*b*, respectively, and prevent, restrict, limit, or reduce the likelihood that the first worm 1018*a* and the second worm 1018*b* are back driven by rotation of the grabber arms 306 about the axis 45*a* and the axis 45*b*, respectively. In some embodiments, due to the anti-back driving characteristic of the engagement between the first worm 1018*a* and the first worm gear 1020*a* and the engagement between the second worm 1018*b* and the second worm gear 1020*b*, the electric brake 1010 is optional.

Alternative Mounting Arrangements and Configurations

Referring to FIGS. 2-17, in some embodiments, the grabber assembly 300 is mounted between forks of a front end loader refuse vehicle. In some embodiments, the grabber assembly 300 can be operated to grasp a refuse collection bin or waste receptacle and arms of the front end loader upon which the grabber assembly 300 is mounted can be operated to dump the contents of the refuse collection bin or the waste receptacle into a hopper of the front end loader refuse vehicle. In some embodiments, the grabber assembly 300 is mounted on an end of the extension assembly 200 which is coupled between the forks of the front end loader. Advantageously, mounting the grabber assembly 300 and/or the extension assembly 200 on forks of the front end loader can facilitate improved visibility, and reduce a need for a side camera to view operational status of a side loading configuration of the grabber assembly 300. Further, mounting the grabber assembly 300 and/or the extension assembly on the forks of the front end loader (e.g., off the side of the forks, or between the forks in a frontwards direction) can reduce a footprint of the loading apparatus.

Figure 18:
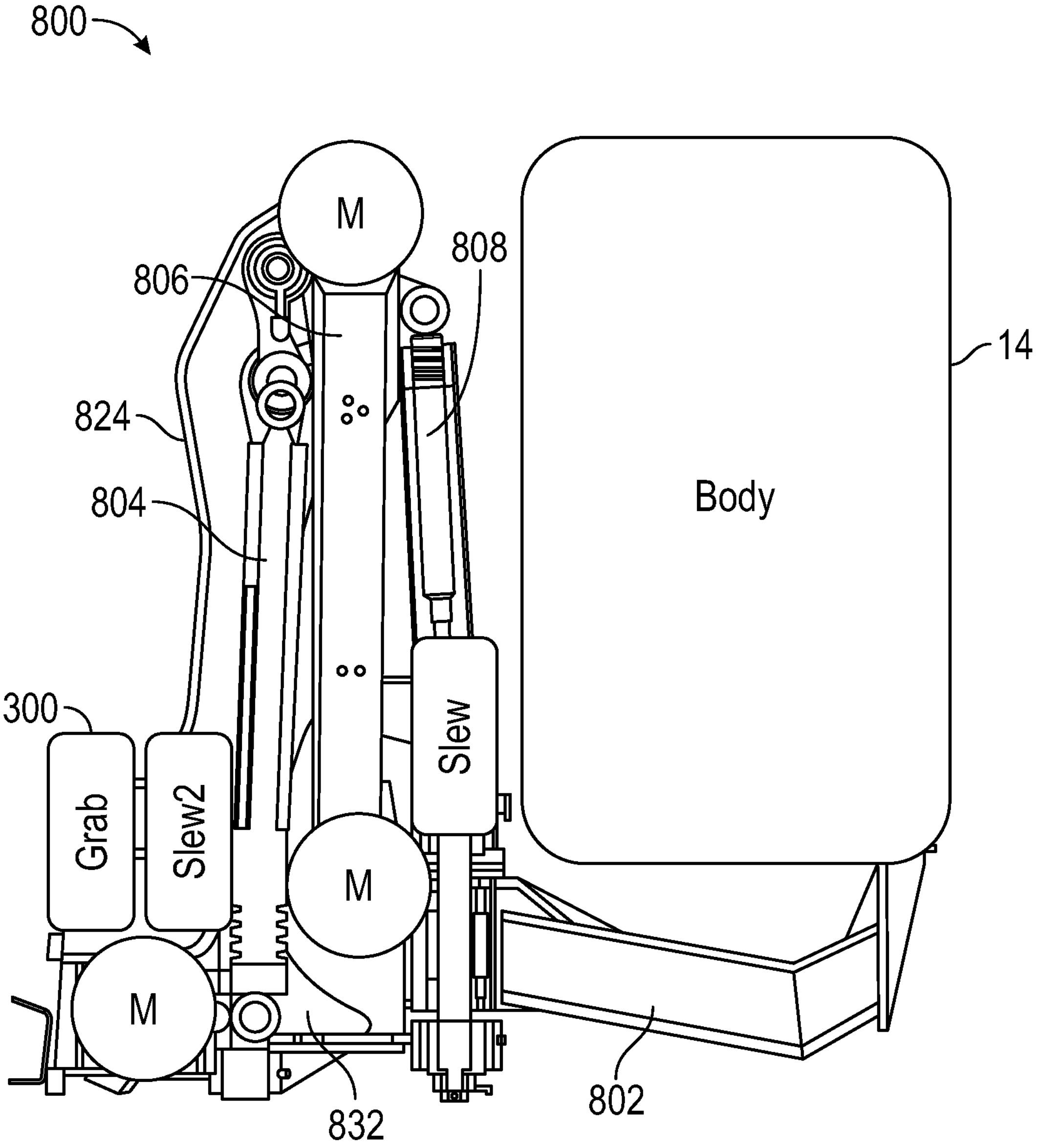
FIG. 18 is a sectional view of a six degrees of freedom arm for a grabber assembly, according to some embodiments.
Figure 19:
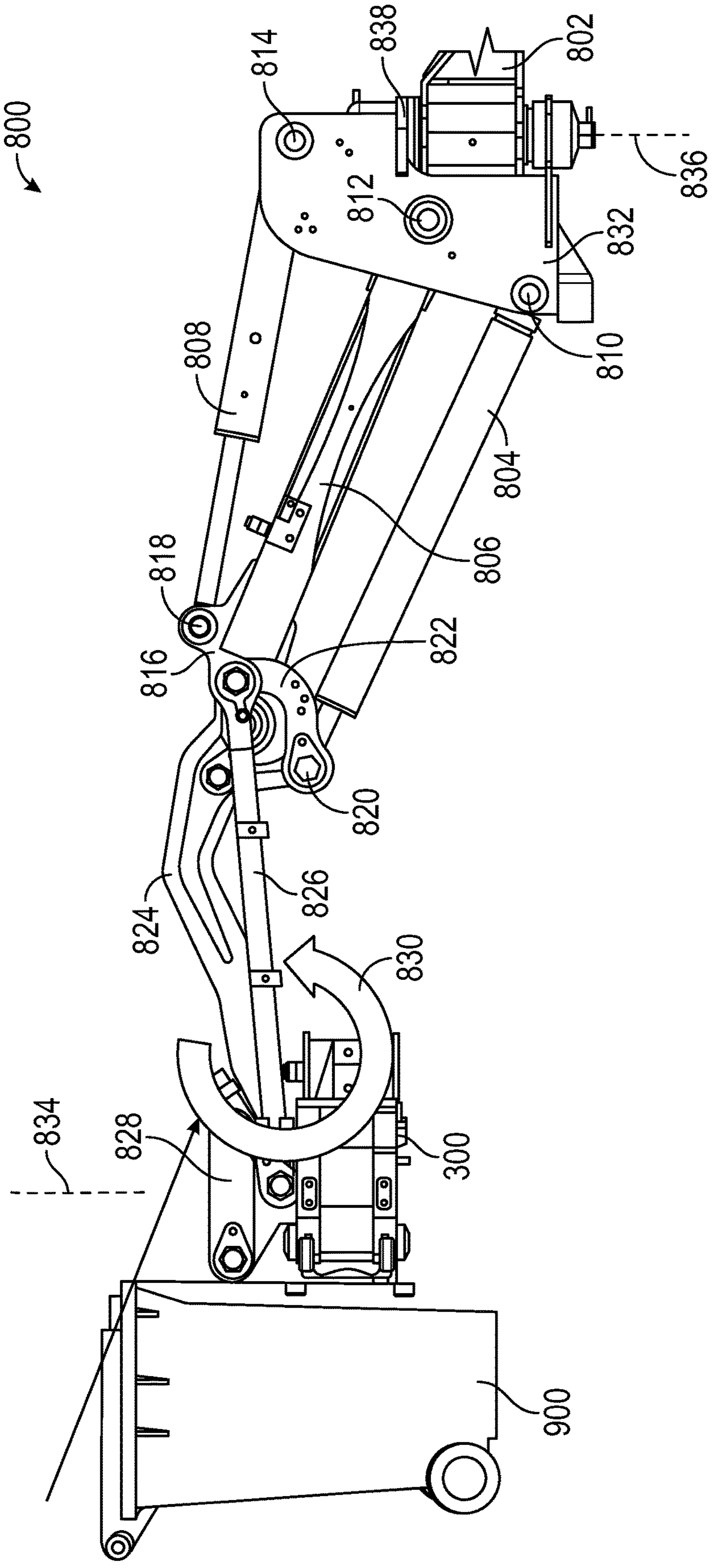
FIG. 19 is a side view of the six degrees of freedom arm of FIG. 18, according to some embodiments.

Referring to FIGS. 18-19, the grabber assembly 300 can be mounted on a six degree of freedom ("6-DOF") arm, shown as 6-DOF arm 800. The 6-DOF arm 800 includes a frame 832 that is coupled with an extension member 802 which extends from the body 14 or the frame 12 of the refuse vehicle 10. In some embodiments, the 6-DOF arm 800 includes a first actuator 804 pivotally coupled with the frame 832 at a point 810, a second actuator 808 pivotally coupled with the frame 832 at a point 814, and a main member 806 pivotally coupled with the frame 832 at a point 812. In some embodiments, the second actuator 808 is configured to be driven by a slewing motor to extend or retract to thereby pivot about the point 814. In some embodiments, the 6-DOF arm 800 also includes an intermediate member 816, and an arm 824. The intermediate member 816 and the arm 824 may be pivotally coupled with each other. The first actuator 804 is pivotally coupled with the intermediate member 816 at a point 818. In some embodiments, the main member 806 is fixedly coupled with the intermediate member 816. In some embodiments, the 6-DOF arm 800 also includes a curved member 822 that extends between and pivotally couples with the first actuator 804 at a point 820 and pivotally couples with the intermediate member 816. The 6-DOF arm 800 may also include a linkage 826 that extends between the intermediate member 816 and an end of the arm 824. In some embodiments, a rotatable carriage 828 is positioned at an end of the arm 824 and the linkage 826. In some embodiments, the first actuator 804 and the second actuator 808 have slewing drives and corresponding electric motors configured to drive them to extend or retract. In some embodiments, the grabber assembly 300 can be driven to rotate about a Z-axis 834 of the rotatable carriage 828 by an electric motor in order to square the grabber assembly 300 with a refuse container 900. In some embodiments, the 6-DOF arm 800 is also rotatable or pivotable about an axis 836 of a rotatable coupling 838 relative to the extension member 802 and the refuse vehicle 10. In some embodiments, the grabber assembly 300 is also rotatable about a horizontal axis in a direction 830 or an opposite direction to facilitate alignment with the refuse container 900. The slewing drives of the first actuator 804 and the second actuator 808 can be configured to extend or retract the grabber assembly 300 from a side or front of the refuse vehicle 10. In some embodiments, the 6-DOF arm 800 is operable or controllable by a first joystick and a second joystick (e.g., in addition to a steering wheel of the refuse vehicle 10).

Referring to FIGS. 2-19 any of the grabber assembly 300, the extension assembly 200, the lift assembly 100, or the 6-DOF arm 800 are coupled with an intermediary container that is coupled to a pair of arms or forks of the refuse vehicle 10 (e.g., front end loader forks). In some embodiments, the intermediary container is a carry can. In some embodiments, the intermediary container is positioned on a front of the refuse vehicle 10 and is able to transition between a first position for collecting refuse and a second position for dumping the collected refuse into a main container (e.g., the refuse compartment 30). In some embodiments, the extension assembly 200, the lift assembly 100, and the grabber assembly 300 (or the 6-DOF arm 800) are coupled on the refuse container 202 as described in greater detail in U.S. application Ser. No. 16/047,903, filed Jul. 27, 2018, now U.S. Pat. No. 10,351,340, the entire disclosure of which is incorporated by reference herein.

Process

Figure 20:
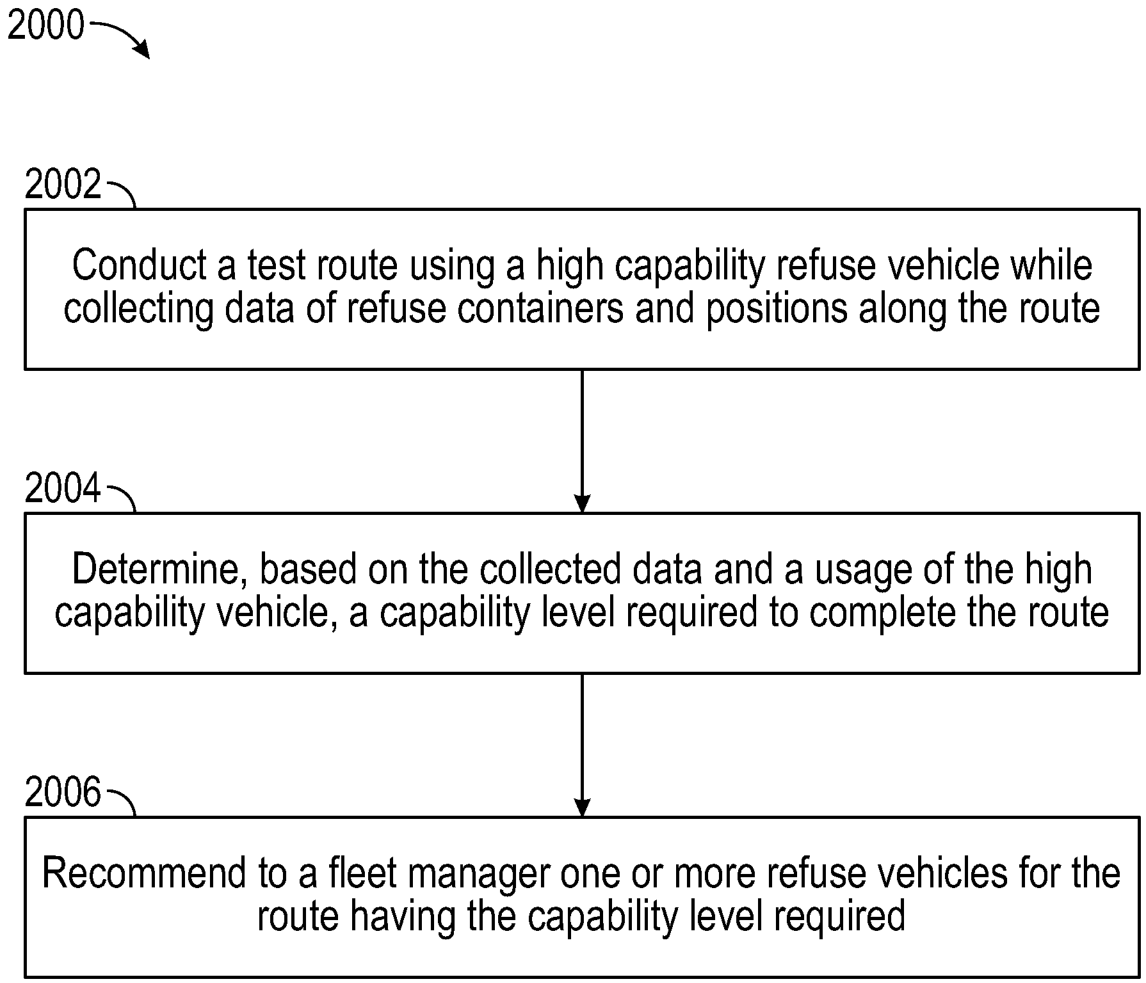
FIG. 20 is a flow diagram of a process for recommending a refuse vehicle for a collection route, according to some embodiments.

Referring to FIG. 20, a flow diagram of a process 2000 for determining a type or model of refuse vehicle required to perform a collection route includes step 2002, step 2004, and step 2006, according to some embodiments. In some embodiments, process 2000 is performed to generate a recommendation for a fleet manager indicating which refuse vehicles can adequately complete the collection route and meet requirements along the route. Process 2000 can be performed by a server, a cloud computing system, or an on-site server at a refuse fleet facility.

Process 2000 includes conducting a test route using a high capability refuse vehicle while collecting data of refuse containers and positions along the route (step 2002), according to some embodiments. Step 2002 may also include monitoring usage data (e.g., load data) of a lifting apparatus of the refuse vehicle.

Process 2000 includes determining, based on the collected data, and a usage of the high capability vehicle, a capability level required to complete the route (step 2004), according to some embodiments. In some embodiments, step 2004 includes identifying a load or lifting ability required to complete a heaviest lift along the route and selecting a refuse vehicle having a suitable lift capacity (e.g., sufficiently sized electric or hydraulic motors).

Process 2000 includes recommending to a fleet manager one or more refuse vehicles for the route having the capability level required (step 2006), according to some embodiments. In some embodiments, step 2006 includes presenting (e.g., via a display screen) the recommendation to the fleet manager (e.g., in a web browser).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:

a frame;

a grabber assembly configured to selectively engage a refuse container;

a lift assembly coupled to the grabber assembly, the lift assembly including:

a track;

a first electric motor configured to drive the lift assembly to raise the grabber assembly along the track;

a first linkage member received within the track; and a second linkage member received within the track and coupling the first linkage member to the grabber assembly, the first linkage member pivotally coupling the grabber assembly to the second linkage member; and an extension assembly coupled to the frame and the lift assembly, the extension assembly including a second electric motor configured to drive the extension assembly to move the lift assembly relative to the frame.

2. The refuse vehicle of claim 1, wherein the extension assembly further includes:

a first member; and a second member slidably coupled to the first member, wherein the second member is configured to move relative to the first member to laterally reposition the lift assembly relative to the frame.

3. The refuse vehicle of claim 2, wherein the extension assembly further includes a third member slidably coupled to the second member, wherein the first member is directly coupled to the frame, wherein the third member is directly coupled to the lift assembly, wherein the second member is received within the first member, and wherein the third member is received within the second member.

4. The refuse vehicle of claim 2, wherein the extension assembly further includes:

a third member slidably coupled to the second member;

a guide coupled to the second member; and a tensile member engaging the guide and fixedly coupled to the first member and the third member, wherein the tensile member is configured to move the third member in a first direction relative to the second member in response to movement of the second member in the first direction relative to the first member.

5. The refuse vehicle of claim 4, wherein the guide is a first guide, wherein the extension assembly further includes a second guide coupled to the second member and engaging the tensile member, and wherein the tensile member is configured to move the third member in a second direction relative to the second member in response to movement of the second member in the second direction relative to the first member.

6. The refuse vehicle of claim 2, wherein the extension assembly further includes:

a pinion coupled to the first member; and a rack coupled to the second member and engaging the pinion, wherein the second electric motor is configured to drive the pinion to cause the second member to translate relative the first member.

7. The refuse vehicle of claim 6, wherein the extension assembly further includes:

a third member slidably coupled to the second member;

a guide coupled to the second member; and a tensile member engaging the guide and fixedly coupled to the first member and the third member, wherein the tensile member is configured to move the third member relative to the second member in response to the second electric motor driving the pinion.

8. The refuse vehicle of claim 1, wherein the lift assembly further includes a track having a straight portion and a curved portion and a carriage coupled to the grabber assembly, and wherein the first electric motor is configured to move the carriage along the track.

9. The refuse vehicle of claim 8, wherein the lift assembly further includes:

a drive member positioned along the straight portion of the track;

a guide positioned along the curved portion of the track; and a tensile member coupled to the carriage and engaging the drive member and the guide, wherein the first electric motor is configured to drive rotation of the drive member.

10. The refuse vehicle of claim 9, wherein the second linkage member couples the first linkage member to the carriage.

11. The refuse vehicle of claim 10, wherein the first linkage member is disposed within a straight portion of the track when the lift assembly is raised to a fully lifted position, and the second linkage member is disposed within a curved portion of the track when the lift assembly is raised to the fully lifted position.

12. The refuse vehicle of claim 10, further comprising a link extending between the first linkage member and the second linkage member, wherein the second linkage member pivotally couples the link to the carriage.

13. The refuse vehicle of claim 12, wherein the carriage rotates relative to the link as the second linkage member travels along the curved portion of the track.

14. The refuse vehicle of claim 1, further comprising:

a cab coupled to the frame and configured to support an operator;

a tractive element coupled to the frame; and a body defining a refuse compartment, wherein the lift assembly is configured to raise the grabber assembly to deposit refuse from the refuse container into the refuse compartment.

15. An extension assembly for a refuse vehicle, the extension assembly comprising:

a first member configured to be coupled to a frame of the refuse vehicle;

a second member configured to translate relative to the first member;

a third member configured to be coupled to a grabber assembly and configured to translate relative to the second member;

a pinion coupled to the first member;

an electric motor coupled to the pinion;

a rack coupled to the second member and engaging the pinion;

a first guide and a second guide coupled to the second member, the first guide and the second guide positioned entirely within an inner volume of the second member; and a tensile member extending between and engaging the first guide and the second guide, wherein the first member is fixedly coupled with the tensile member at a first point and the third member is fixedly coupled with the tensile member at a second point, wherein the electric motor is configured to drive the pinion to cause the second member to translate relative to the first member, wherein the tensile member causes the third member to translate relative to the second member in response to translation of the second member relative to the first member.

16. The extension assembly of claim 15, wherein the first guide is a first sprocket, wherein the second guide is a second sprocket, and wherein the tensile member is a chain, and wherein the first member defines a window, and the pinion is configured to engage with the rack through the window.

17. The extension assembly of claim 15, wherein the second member extends within the first member, and wherein the third member extends within the second member.

18. A lift assembly for a refuse vehicle, the lift assembly comprising:

a track having a straight portion and a curved portion extending above the straight portion;

a drive member rotatably coupled to the straight portion of the track;

an electric motor configured to drive rotation of the drive member;

a guide rotatably coupled to the curved portion of the track;

a tensile member engaging the drive member the guide;

a carriage fixedly coupled to the tensile member;

a linkage coupling the carriage to the track, the linkage including a first member received within the track and a second member received within the track and coupling the first member to the carriage, the first member allowing movement of the carriage relative to the second member as the first member travels along the curved portion of the track; and a grabber assembly coupled to the carriage and configured to selectively engage a refuse container.

19. The lift assembly of claim 18, wherein the drive member is a drive sprocket coupled to the electric motor, wherein the guide is an idler sprocket, and wherein the tensile member is a chain engaging the drive sprocket and the idler sprocket.

20. The lift assembly of claim 18, wherein the first member is received within a channel defined by the track, and wherein the second member is received within the channel below the first member.

* * * * *